US007960892B2

(12) United States Patent
Cutsforth

(10) Patent No.: US 7,960,892 B2
(45) Date of Patent: Jun. 14, 2011

(54) RESILIENT MEMBER FOR A BRUSH HOLDER ASSEMBLY

(75) Inventor: Robert S. Cutsforth, Bellingham, WA (US)

(73) Assignee: Cutsforth Products, Inc., Cohasset, MN (US)

( * ) Notice: Subject to any disclaimer, the term of this patent is extended or adjusted under 35 U.S.C. 154(b) by 0 days.

(21) Appl. No.: 12/885,747

(22) Filed: Sep. 20, 2010

(65) Prior Publication Data

US 2011/0006635 A1 Jan. 13, 2011

Related U.S. Application Data

(63) Continuation of application No. 12/475,869, filed on Jun. 1, 2009, now Pat. No. 7,816,834, which is a continuation of application No. 11/249,186, filed on Oct. 13, 2005, now Pat. No. 7,545,072.

(51) Int. Cl.
*H02K 13/00* (2006.01)

(52) U.S. Cl. ........................................ 310/239; 310/242

(58) Field of Classification Search .................. 310/239, 310/245–253

See application file for complete search history.

(56) References Cited

U.S. PATENT DOCUMENTS 3,308,321 A 3/1967 Provost, Jr.
3,480,814 A 11/1969 Amrein
3,628,051 A * 12/1971 Chigirinshy et al. ......... 310/240
4,190,781 A * 2/1980 Sauerwein et al. ........... 310/239
4,246,508 A 1/1981 Zimmer
4,266,155 A 5/1981 Niemela
4,782,261 A * 11/1988 Crevling et al. .............. 310/242
4,963,779 A * 10/1990 Lentino et al. .................. 310/71
5,114,351 A 5/1992 Hoffman
5,198,712 A 3/1993 Bolzan, Jr. et al.
5,621,262 A 4/1997 Han
5,631,513 A 5/1997 Coles et al.
6,552,467 B1 * 4/2003 Suriano et al. ................ 310/249
6,731,042 B1 5/2004 Bank et al.
6,800,981 B2 10/2004 Kuhlmann-Wilsdorf
6,903,484 B1 6/2005 Kuhlmann-Wilsdorf

FOREIGN PATENT DOCUMENTS

DE 3142879 11/1983
DE 8906152 11/1989
EP 0086386 8/1983
WO 0237619 5/2002

OTHER PUBLICATIONS

Reichner et al., "Shunts for High-Current Density Brushes," IEEE Transactions on Components, Hybrids, and Manufacturing Technology, vol. CHMT-2, No. 1, Mar. 1979.

* cited by examiner

*Primary Examiner* — Thanh Lam
(74) *Attorney, Agent, or Firm* — Seager, Tufte & Wickhem, LLC

(57) ABSTRACT

Disclosed is a resilient member for use in a brush holder assembly. The resilient member may be positioned between at least a portion of a brush and at least a portion of a brush holder. For example, the resilient member may separate or isolate one or more sides of a brush from an adjacent surface of a brush holder. In some embodiments, the resilient member may prevent at least one side of a brush from impacting an adjacent surface of a brush holder. In some embodiments, the resilient member may be a conductive member forming an electrical pathway between the brush and the brush holder for transferring an electrical current between the brush and the brush holder.

20 Claims, 17 Drawing Sheets

RESILIENT MEMBER FOR A BRUSH HOLDER ASSEMBLY

CROSS-REFERENCE TO RELATED APPLICATIONS

This application is a continuation of U.S. patent application Ser. No. 12/475,869, filed on Jun. 1, 2009, which claims priority to U.S. patent application Ser. No. 11/249,186, filed on Oct. 13, 2005 now U.S. Pat. No. 7,545,072; which are all incorporated herein by reference.

TECHNICAL FIELD

The invention generally relates to brush holder assemblies that may be used in electrical devices and/or slip ring assemblies. More specifically, the invention relates to a brush holder assembly having a resilient member interposed between at least a portion of a brush and at least a portion of a brush holder.

BACKGROUND

A purpose of a brush in an electrical device is to pass electrical current from a stationary contact to a moving contact surface, or vice versa. Brushes and brush holders may be used in electrical devices such as electrical generators, electrical motors, and/or slip ring assemblies, for example, slip ring assemblies on a rotating machine such as a rotating crane. Brushes in many electrical devices are blocks or other structures made of conductive material, such as graphite, carbon graphite, electrographite, metal graphite, or the like, that are adapted for contact with a conductive surface or surfaces to pass electrical current.

In some designs, a brush box type brush holder is used to support the brush during operation. The brush and box are designed such that the brush can slide within the box to provide for continuing contact between the brush and the conductive surface contacted by the brush. As the brush slides within the box, one or more outer surfaces of the brush may rub against the inner surface of the brush box, which can create deposits of brush material on the inner surface of the brush box. Furthermore, during wear of a brush, fine particles and/or dust can be created, which can collect on nearby surfaces and the inside of the brush box, between the inner surface of the brush box and the brush, and also can create deposits of brush material on the inside of the brush box. Such deposits can restrict sliding movement of the brush within the box, which in turn can reduce the quality of the contact between the brush and the contact surface. A build-up of deposits may adversely affect the wear rate of the brush and/or the conductive surface contacting the brush.

Additionally, some brush designs include one or more electrical shunts or wires to provide an electrical current path from the brush to another structure. In at least some designs, the one or more electrical shunts are typically attached to the brush opposite the wear surface by a tamping or riveting method. Over time, the brush will be reduced in size, or get shorter, for example as the wear surface of the brush in frictional contact with the conductive surface wears down. As the brush is worn, the distance between the wear surface of the brush contacting the moving conductive surface and the attachment point of the shunt is reduced. A brush creates a certain amount of electrical resistance, which is dependent on the distance between the wear surface and the attachment point of the shunt. For example, a new brush may have an initial length that creates the greatest resistance through the brush because the distance between the wear surface and the attachment point of the shunt is greatest in a new brush. As the brush wears, the distance between the wear surface and the attachment point of the shunt is reduced, thus reducing the resistance through the electrical pathway extending through the brush. This variability in resistance can be undesirable.

A number of different brushes and brush holder structures, assemblies, and methods are known, each having certain advantages and disadvantages. However, there is an ongoing need to provide alternatives.

SUMMARY

The invention is related to brush holder assemblies, and in some embodiments, relates to a brush holder assembly having a resilient member interposed between at least a portion of a brush and at least a portion of a brush holder.

In some embodiments, a resilient member may be positioned between at least a portion of a brush and at least a portion of a brush holder. In some embodiments, the resilient member may prevent at least one side of a brush from impacting an adjacent surface of a brush holder. In some embodiments, the resilient member may be a conductive member forming an electrical pathway between the brush and the brush holder for transferring an electrical current between the brush and the brush holder.

Accordingly, some embodiments are related to a resilient sleeve including a plurality of sidewalls. The sleeve may include a first surface configured to be placed in intimate contact with a surface of a brush, and a second surface including a plurality of resilient tabs configured to be placed in intimate contact with an adjacent surface of a brush holder. The first surface of the resilient sleeve may provide bi-directional sliding contact with the brush, such that the brush may freely slide against the resilient sleeve.

Some embodiments are related to a resilient member that may be one or more members disposed between one or more sides of a brush and one or more sides of a brush box type brush holder. The one or more members may include an inner surface in frictional sliding contact with the brush, and the one or more members may include a plurality of protrusions extending from the outer surface of the one or more members. The plurality of protrusions may be configured to contact the inner surface of a brush box type brush holder.

Some embodiments relate to a resilient member that may be a corrugated member having an undulating first surface and/or an undulating second surface. At least a portion of the first surface may be in contact with a surface of a brush, and at least a portion of the second surface may be in contact with an adjacent surface of a brush holder. The corrugated member may provide bi-directional sliding contact with the brush, such that the brush may freely slide against the corrugated member.

Some embodiments may provide a brush assembly that reduces and/or eliminates the build-up of deposits within a brush box and/or allows for a reduction in the restriction of movement of a brush that may be presented by such deposits.

Additionally, some embodiments may provide an electrical pathway through a brush assembly that provides a relatively constant resistance through the brush throughout the lifecycle of the brush. Some embodiments provide for an alternate means of conducting an electrical current to and/or from the brush, not requiring a wire shunt attached to the brush.

BRIEF DESCRIPTION OF THE DRAWINGS

The invention may be more completely understood in consideration of the following detailed description of various embodiments in connection with the accompanying drawings, in which.

Figure 1:
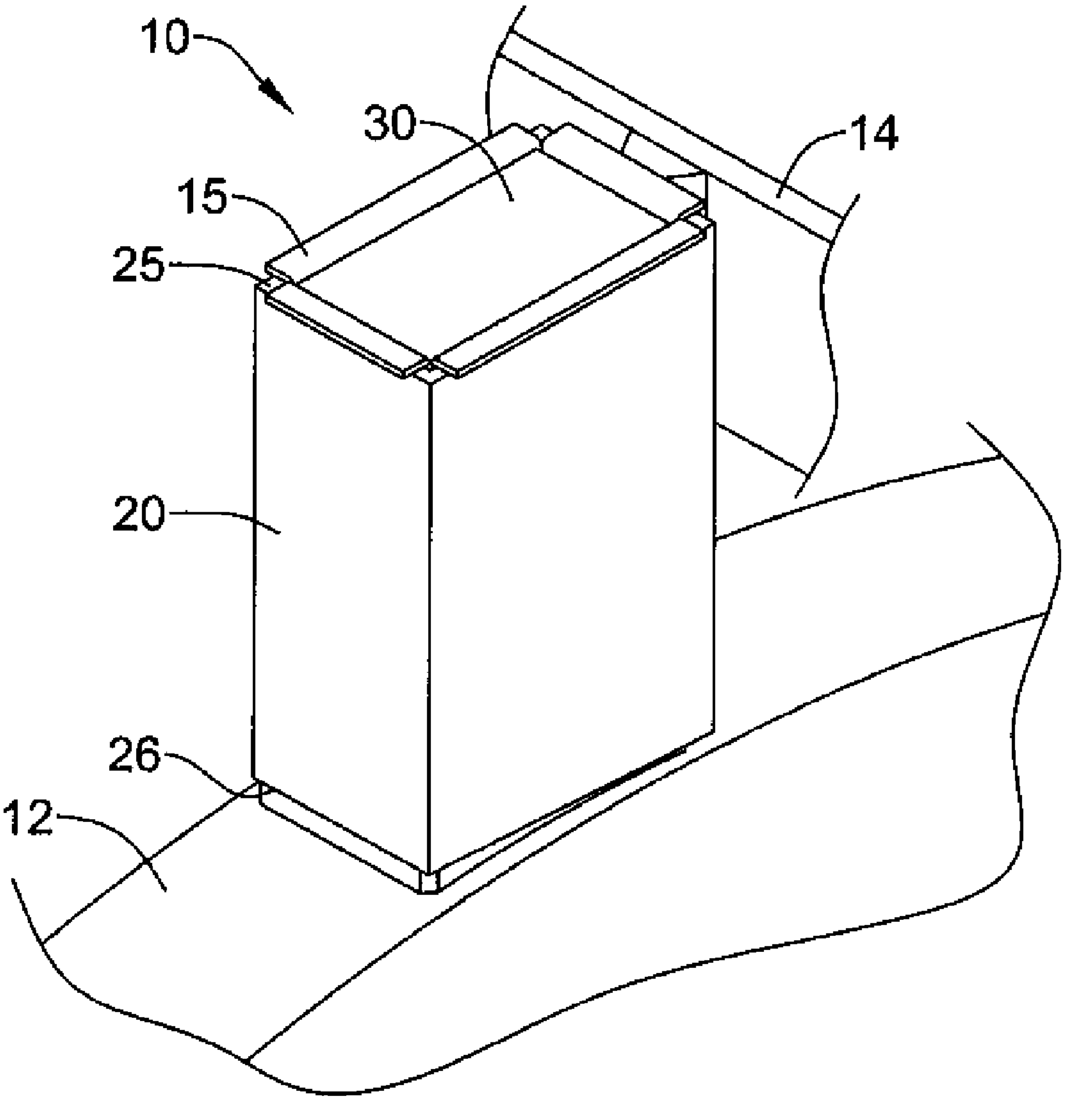
FIG. 1 is a perspective view of an illustrative brush holder assembly.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

For the following defined terms, these definitions shall be applied, unless a different definition is given in the claims or elsewhere in this specification.

All numeric values are herein assumed to be modified by the term “about”, whether or not explicitly indicated. The term “about” generally refers to a range of numbers that one of skill in the art would consider equivalent to the recited value (i.e., having the same function or result). In many instances, the term “about” may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

As used in this specification and the appended claims, the singular forms “a”, “an”, and “the” include plural referents unless the content clearly dictates otherwise. As used in this specification and the appended claims, the term “or” is generally employed in its sense including “and/or” unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

Referring to FIG. 1, an illustrative brush holder assembly 10 is shown. The brush holder assembly 10 includes a brush holder, such as a brush box 20, mounted to a rigid frame 14. A brush 30 is positioned in the brush box 20, such that a bottom surface (i.e. the wear surface) of the brush 30 is in contact with a conductive surface 12, which may be a moving surface or a stationary surface. In some embodiments, the conductive surface 12 may be a rotating surface, such as the surface of a collector ring, a slip ring, a commutator, or the like. Such surfaces may be rotating at a desired speed for the particular device. For example, some devices may include such structures rotating at speeds in the range of about 1800 to about 3600 revolutions per minute (RPM). However, as will be understood by those of skill in the art and others, the particular speed at which such structures rotate may vary from those given above.

A portion of the brush 30 may extend below the bottom edge 26 of the brush box 20, thus extending from the brush box 20. A resilient member 15 may be positioned between at least a portion of the brush 30 and at least a portion of the brush box 20. For example, the resilient member 15 may physically separate or isolate one or more sides of the brush 30 from the inner surface of the brush box 20. In some embodiments, the resilient member 15 may separate or isolate one, two, three, four, or more sides of the brush 30 from the inner surface of the brush box 20. In some embodiments, additional resilient members 15 (attached or unattached to one another) may be positioned between the brush 30 and the inner surface of the brush box 20 to separate or isolate the brush 30 from the brush box 20. For example, a plurality of resilient members 15, wherein each resilient member 15 is positioned between one side of the brush 30 and one wall of the brush box 20, may be used to separate or isolate two, three, four, or more sides of the brush 30 from the inner surface of the brush box 20. In other embodiments, a plurality of resilient members 15, wherein each resilient member 15 is positioned between one or more of the sides of the brush 30 and the inner surface of the brush box 20, may be used to separate or isolate two, three, four or more sides of the brush 30 from the inner surface of the brush box 20. Thus, one or more of the sides of the brush 30 may be spaced from or free of the inner surface of the brush box 20, such that one or more sides of the brush 30 are not in contact with the inner surface of the brush box 20. The brush 30 may be in sliding contact, such as bi-directional sliding contact, with the inner surface of the resilient member 15. For example, the brush 30 may be slidably disposed relative to and/or within the resilient member 15 such that it may slide in at least two directions, for example, up and down (e.g. toward and away from the conductive surface 12), relative to and/or within the resilient member 15. In some embodiments, the brush 30 may be in contact with the resilient member 15 over a large area of the inner surface of the resilient member 15. By contacting the brush 30 over a large surface area, the resilient member 15 may contact the brush 30 in a way so as not to wear or erode the brush 30.

Additionally, the brush holder assembly 10 may include a biasing member (not shown), such as a spring, for example a constant force spring, a coil spring, a helical spring, or the like, or other member providing a force biasing and/or holding the brush 30 in contact with the conductive surface 12. One example of such a spring is disclosed, for example, in the embodiment shown in FIGS. 10 and 11, discussed below.

The resilient member 15 may comprise any desired material. Materials may be classified as conductors, semiconductors, and insulators. Conductors are typically considered to be materials having a resistivity in the range of less than about $10^{-5}$ Ω-m, semiconductors are typically considered to be materials having a resistivity in the range of about $10^{-5}$ to about $10^{8}$ Ω-m, and insulators are typically considered to be materials having a resistivity in the range of greater than about $10^{8}$ Ω-m. Conductors are considered to be materials which readily pass an electrical current. Metallic materials, as well as carbon (e.g., graphite), are considered to be good conductors of electricity. Silver has a resistivity of about $1.6\times10^{-8}$ Ω-m, copper has a resistivity of about $1.7\times10^{-8}$ Ω-m, aluminum has a resistivity of about $2.8\times10^{-8}$ Ω-m, and graphite carbon has a resistivity of about $6.5\times10^{-7}$ Ω-m. Other electrical conductors include, but are not limited to, beryllium, brass, chromium, gold, iron, nickel, palladium, platinum, tin, and tungsten. Semiconductors include those materials which exhibit some natural conducting ability. Silicon, which has a resistivity of about 640 Ω-m, and germanium, which has a resistivity of about $4.6\times10^{-1}$ are two elements found in Group IV of the periodic table of elements that are considered to be semiconductors. Insulators are considered to be materials which do not readily pass an electrical current. Glass, polymers, wood, rubber, and some synthetic materials are considered to be insulators. Glass has a resistivity of about $1.7\times10^{11}$ Ω-m and rubber has a resistivity of about $1\times10^{16}$ Ω-m.

In some embodiments, the resilient member 15 may include a conductive material, including, but not limited to, those materials listed above. For example, the resilient member 15 may comprise aluminum, beryllium, brass, chromium, copper, gold, iron, nickel, palladium, platinum, silver, tin, tungsten, or alloys thereof, or the like. In some embodiments, the resilient member 15 may be copper or a copper alloy, for example, a beryllium copper material. Thus, the resilient member 15 may provide an electrically conductive pathway between the outer surface of the brush 30 and the inner surface of the brush box 20. In some embodiments wherein the resilient member 15 is used to provide an electrically conductive pathway between the brush 30 and the brush box 20, a shunt or wire, conventionally extending from the brush 30 to provide an electrically conductive pathway may be absent. Thus, in some embodiments, the resilient member 15 may replace a shunt or wire extending from the brush, typically found in many conventional assemblies.

In some embodiments, where the resilient member 15 is not intended to provide an electrically conductive pathway between the outer surface of the brush 30 and the inner surface of the brush box 20, the resilient member 15 may comprise an insulative material or a semiconductive material, such as those described above or others generally known in the art.

Additionally or alternatively, the resilient member 15 may provide a resilient interface between the inner surface of the brush box 20 and the outer surface of the brush 30. The resiliency of the resilient member 15 may reduce or eliminate the brush 30 from impacting the inner surface of the brush box 20, thus reducing or eliminating the formation of deposits, such as carbon or graphite deposits, or the like, between the brush 30 and the brush box 20. The resilient member 15 may space apart at least a portion of the inner surface of the brush box 20 from the outer surface of the brush 30, such that deposits, such as deposits of brush material, are not compacted and/or formed between the brush 30 and the brush box 20. Furthermore, the resilient member 15 may absorb vibrations, deflections, shifts, or other movements of the brush 30 within the brush box 20. Additionally, the resilient member 15 may flexibly support the brush 30 within the brush box 20 or guide surfaces, thereby allowing the wear surface of the brush 30 to follow and/or ride on the conductive surface 12, which may include some irregularities and/or structure that may cause the brush to ride up and down on the surface 12.

In some embodiments, the resilient member 15 may be a removable and/or replaceable component of a brush holder assembly 10. Therefore, the resilient member 15 may be readily replaced as desired. For example, the resilient member 15 may be replaced when a new brush 30 is substituted into the assembly 10 or during scheduled or unscheduled maintenance of the assembly 10. The resilient member 15 may extend entirely through the brush box 20 from the top edge 25 of the brush box 20 to the bottom edge 26 of the brush box 20, or a portion thereof.

Figure 2:
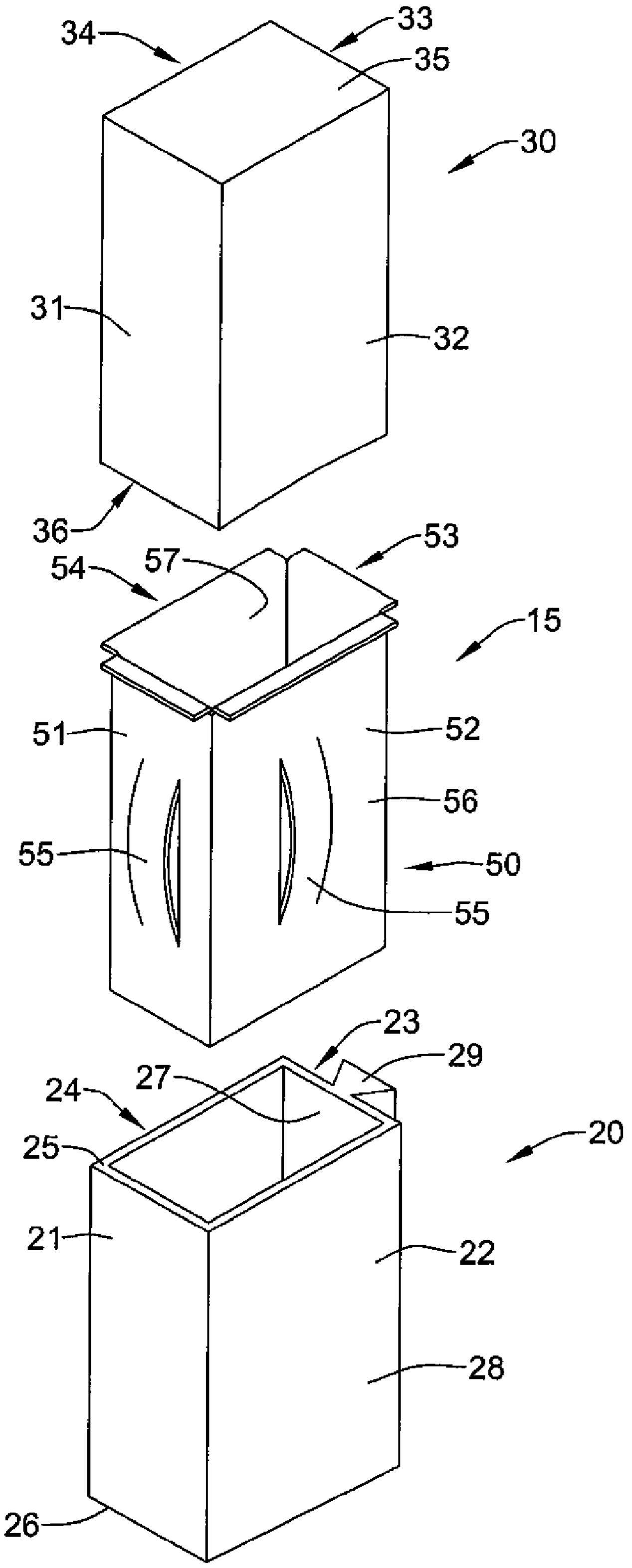
FIG. 2 is an exploded view of the illustrative brush holder assembly shown in FIG. 1.

FIG. 2 shows an exploded view of the brush holder assembly 10 shown in FIG. 1. The brush holder, such as the brush box 20, may be an open-ended tubular member having any desired shape. For example, the brush box 20 may be rectangular, square, cylindrical, trapezoidal, or other desired shape. In some embodiments, the brush holder may not take on the form of a box, but may include one or a plurality of guiding surfaces, such as posts or columns, abutting and/or encompassing one or more sides of the brush 30 and/or extending into or through the brush 30, or a portion thereof.

The brush box 20 may have a top edge 25 and a bottom edge 26. As shown in FIG. 2, the brush box 20 may have a plurality of sidewalls, for example, a first sidewall 21, a second sidewall 22, a third sidewall 23, and a fourth sidewall 24. The brush box 20 may include an inner surface 27 and an outer surface 28. Additionally, the brush box 20 may have a mounting portion 29 for mounting the brush box 20 to a framework 14. In some embodiments, the brush box 20 may be in electrical contact with a structure carrying electrical current to or from the brush 30.

The brush 30 may have any desired shape, such as a cylinder, a block, a cone, a wedge, or the like. For instance, as shown in FIG. 2, the brush 30 may be a block having a top surface 35, a bottom surface 36 (e.g., a wear surface), and a plurality of side surfaces. The brush 30 may have a first side surface 31, a second side surface 32, a third side surface 33, and a fourth side surface 34. In some embodiments, the plurality of side surfaces may be planar surfaces, concave surfaces, convex surfaces, or combinations thereof. In some embodiments, the brush 30 may comprise a carbon or carbon composite material. In some embodiments, the brush 30 may be a non-metallic graphite composite block.

The resilient member 15 may be an open-ended or tubular member, such as the sleeve 50 as shown in FIG. 2. The sleeve 50 may include a plurality of sidewalls. For instance, the sleeve 50 may include a first sidewall 51, a second sidewall 52, a third sidewall 53, and a fourth sidewall 54. In some embodiments the plurality of sidewalls may form a fully enclosed peripheral sidewall forming a fully enclosed structure. In other embodiments, the plurality of sidewalls may form a peripheral sidewall not fully enclosed. In other words, the peripheral sidewall may be discontinuous. For example, the sleeve 50 may be a three-sided structure having a plurality of sidewalls formed in a U-shape or the sleeve 50 may be a two-sided structure having a plurality of sidewalls formed in an L-shape. In other embodiments, the sleeve 50 may be a four-sided structure including a gap extending through one sidewall and separating one portion of the sidewall from a second portion of the sidewall, thus creating a discontinuity of the sidewall. In other embodiments, the sleeve 50 may be a four-sided structure, wherein one sidewall includes two sections. A portion of each section may extend beyond a portion of the other section in an overlapping arrangement.

Figure 3:
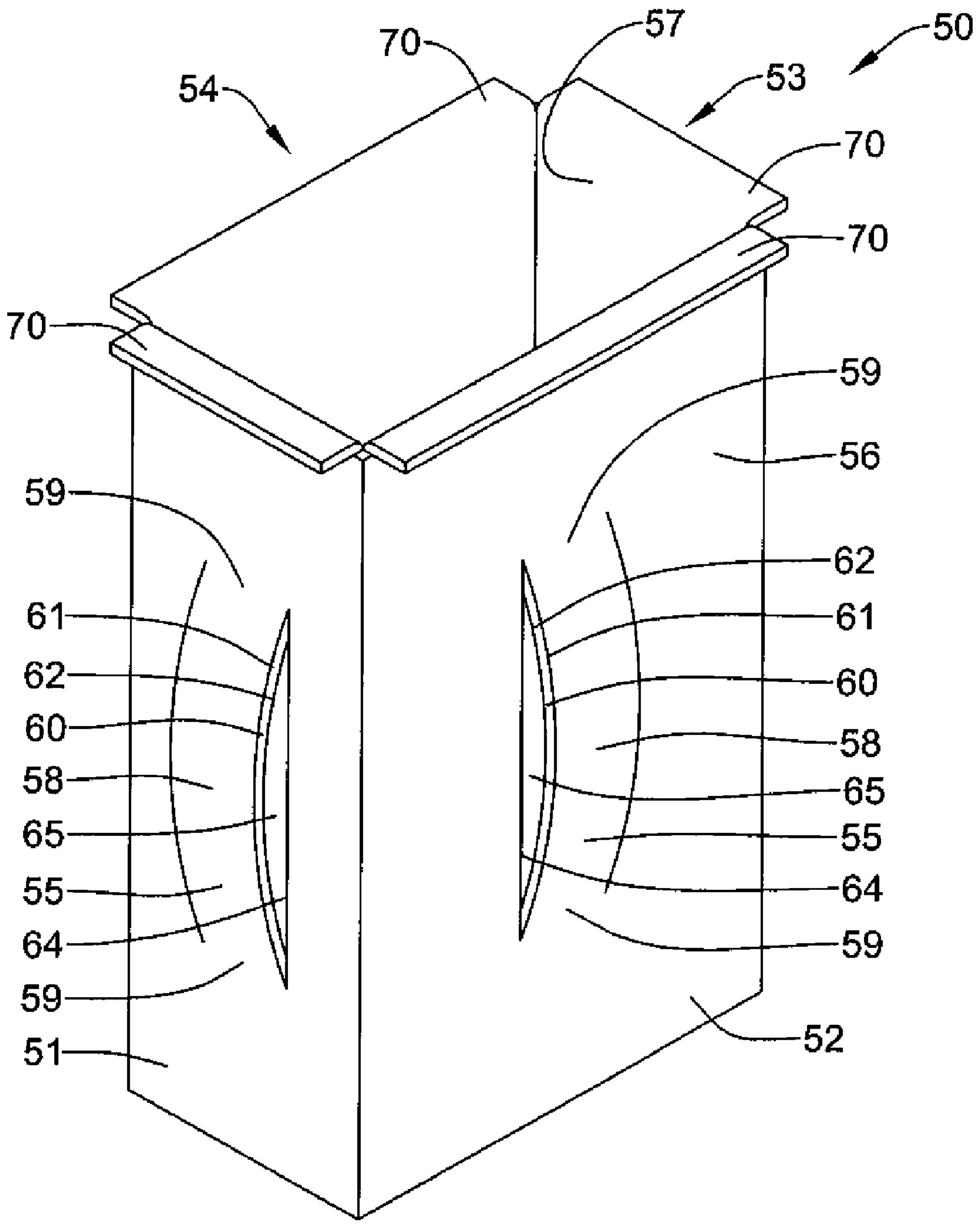
FIG. 3 is a perspective view of an illustrative resilient member for use in a brush holder assembly.

FIG. 3 is an enlarged view of the sleeve 50 shown in FIGS. 1 and 2. The sleeve 50 may have an outer surface 56 and an inner surface 57. The inner surface 57 may be configured and adapted for sliding engagement, such as bi-directional, for example up and down, sliding engagement, with the brush 30. One or more resilient tabs 55 may extend outward from the outer surface 56 of one or more of the sidewalls 51, 52, 53, 54 of the sleeve 50. Thus, a plurality of resilient tabs 55 may extend outward from the outer surface 56 of the sleeve 50 and be configured for engagement with the inner surface 27 of the brush box 20. The resilient tabs 55 may extend outward from the outer surface 56 at an angle, such as an oblique angle or a perpendicular angle, to the outer surface 56 of the sleeve 50. Each resilient tab 55 may include a middle portion 58 protruding from the outer surface 56 of the sidewall 51, 52, 53, 54 and root ends 59 attached to the sidewall 51, 52, 53, 54. The root ends 59 of the resilient tab 55 may be attached to the sidewall 51, 52, 53, 54 by welding, brazing, soldering, adhesive, mechanical fasteners, molding, or other attachment means.

In some embodiments, the two root ends 59 may be integrated with the sidewall 51, 52, 53, 54 of the sleeve 50. In other words, the sleeve 50, or a portion thereof may be a monolithic member (e.g., a unitary member having a continuous molecular structure) including the resilient tab 55. For example, the sleeve 50, or a portion thereof, which may be formed from sheet metal, may be formed during a manufacturing process to provide the resilient tabs 55. In some embodiments, the resilient tab 55 may be punched, stamped, pressed, cut, or otherwise formed from the sidewall 51, 52, 53, 54. In some embodiments, the resilient tab 55 may include one or more side edges 60 defining the edge where the resilient tab 55 was separated from the sidewall 51, 52, 53, 54 during a forming process. During a forming process, the resilient tab 55 may be sheared from the sidewall 51, 52, 53, 54. Thus, the sidewall 51, 52, 53, 54 may include one or more openings 65 corresponding to the one or more resilient tabs 55 projecting from the sidewall 51, 52, 53, 54. As a result of being subjected to a shearing force, in some embodiments, one edge 61 of the resilient tab 55, which may be an outer edge, may be smooth and/or rounded and a second edge 62 of the resilient tab 55, which may be an inner edge, may be sharp and/or jagged. The smooth and/or rounded edge 61 corresponds to the outer surface of the resilient tab 55 separated from the sleeve 50, and the sharp and/or jagged edge 62 corresponds to the inner surface of the resilient tab 55 separated from the sleeve 50. Correspondingly, the opening 65 may include a smooth and/or rounded edge (not shown) on the inner surface 57 of the sleeve 50 and a sharp and/or jagged edge 64 on the outer surface 56 of the sleeve 50. The sharp and/or jagged edges 62, 64 define the last interface between the sidewall 51, 52, 53, 54 and the tab 55 prior to severing the tab 55 from the sidewall 51, 52, 53, 54. Thus, the sharp and/or jagged edges 62, 64 experience a small amount of deformation from tensile shearing forces prior to fracture, creating the sharp and/or jagged edges 62, 64.

It is noted that in embodiments where the tab 55 may extend inward from the inner surface 57 of the sleeve 50, the rounded and jagged edges would be reversed. In other embodiments, the resilient tabs 55 may be pressed outward from the sidewall 51, 52, 53, 54, but not be severed from the sidewall 51, 52, 53, 54. Thus, the resilient tabs 55 may resemble dimples or indentations from the inner surface 57 and extending outward from the outer surface 56. Additionally, the tabs 55 may undergo an additional manufacturing process to polish and/or smooth the sharp and/or jagged edge 62, 64, as well as help create a non-particulating surface. For example, the tabs 55 may be subjected to an electropolishing process, an electroplating process, a burnishing process, a polishing process, a grinding process, or other process to provide a polished surface.

In some embodiments, the sleeve 50 may include a securing structure to impede the sleeve 50 from sliding in the brush box 20 after positioning the sleeve 50 in the brush box 20. For example, the sleeve 50 may include flanges 70. The sleeve 50 may include one, two, three, four, or more flanges 70. As shown in FIG. 3, the first sidewall 51 may be flanged outward, the second sidewall 52 may be flanged outward, the third sidewall 53 may be flanged outward, and/or the fourth sidewall 54 may be flanged outward. The sidewalls 51, 52, 53, 54 may be flanged outward at any desired angle. In some embodiments the sidewalls 51, 52, 53, 54 may be flanged outward at about 45 degrees, at about 90 degrees, or at about 45 to about 90 degrees, or more or less, as desired. The flange 70 may be configured to fit over, engage, and/or abut the top edge 25 of the brush box 20 and/or the bottom edge 26 of the brush box 20, for example.

Figure 4:
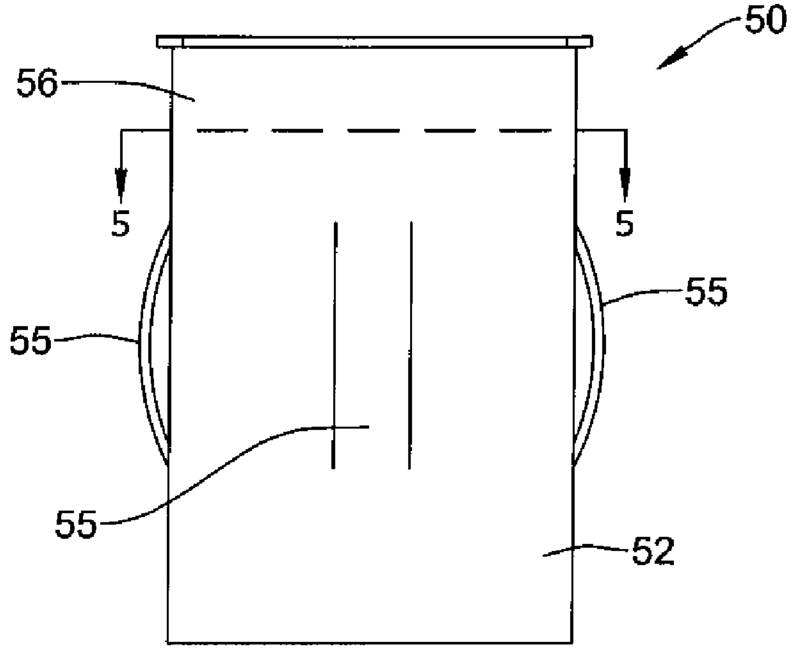
FIG. 4 is a side view of the illustrative resilient member shown in FIG. 3.

FIG. 4 is a side view of the sleeve 50. As shown in FIG. 4, the resilient tabs 55 may bow outward from the outer surface 56 of the sleeve forming a convex surface. In other embodiments, the resilient tabs 55 may be formed to project from the outer surface 56 in other configurations, such as sharp angles, compound angles, curves, or the like.

Figure 5:
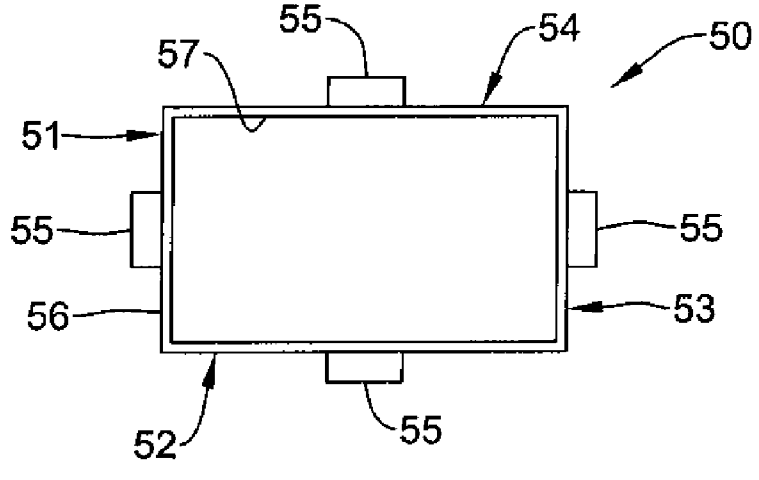
FIG. 5 is a view of the illustrative resilient member of FIG. 4 taken along line 5-5.

FIG. 5 is a view of the sleeve 50 taken along line 5-5 in FIG. 4. As shown in FIG. 5, the tabs 55 extend outward from the outer surface of the sleeve 50. In some embodiments, the sidewalls 51, 52, 53, 54 may include planar inner surfaces 57 and/or planar outer surfaces 56 except for the protruding resilient tabs 55. The sidewalls 51, 52, 53, 54 may be positioned perpendicular to one another, thus forming an open-ended box structure. In some embodiments, the inner surface 57 of the sleeve 50 may contact the brush 30 over a large surface area. In some embodiments, the brush 30 may contact the sleeve 50 over a majority of the inner surface 57 of the sleeve 50 and/or the inner surface 57 of the sleeve 50 may contact the brush 30 over a majority of the surface area of one or more side surfaces 31, 32, 33, 34 of the brush 30. In other embodiments, a substantial portion of the inner surface 57, may contact the brush 30 over a large surface area. For example, about 25%, about 30%, about 40%, about 50%, about 60%, about 75%, or more of the inner surface 57 of the sleeve 50 may contact the brush 30. Additionally or alternatively, about 25%, about 30%, about 40%, about 50%, about 60%, about 75%, or more of one or more of the side surfaces 31, 32, 33, 34, of the brush 30 may contact the inner surface 57 of the sleeve 50. Thus, the sleeve 50 may contact the brush 30 over a large surface area so as not to adversely wear or erode the brush 30.

Figure 6:
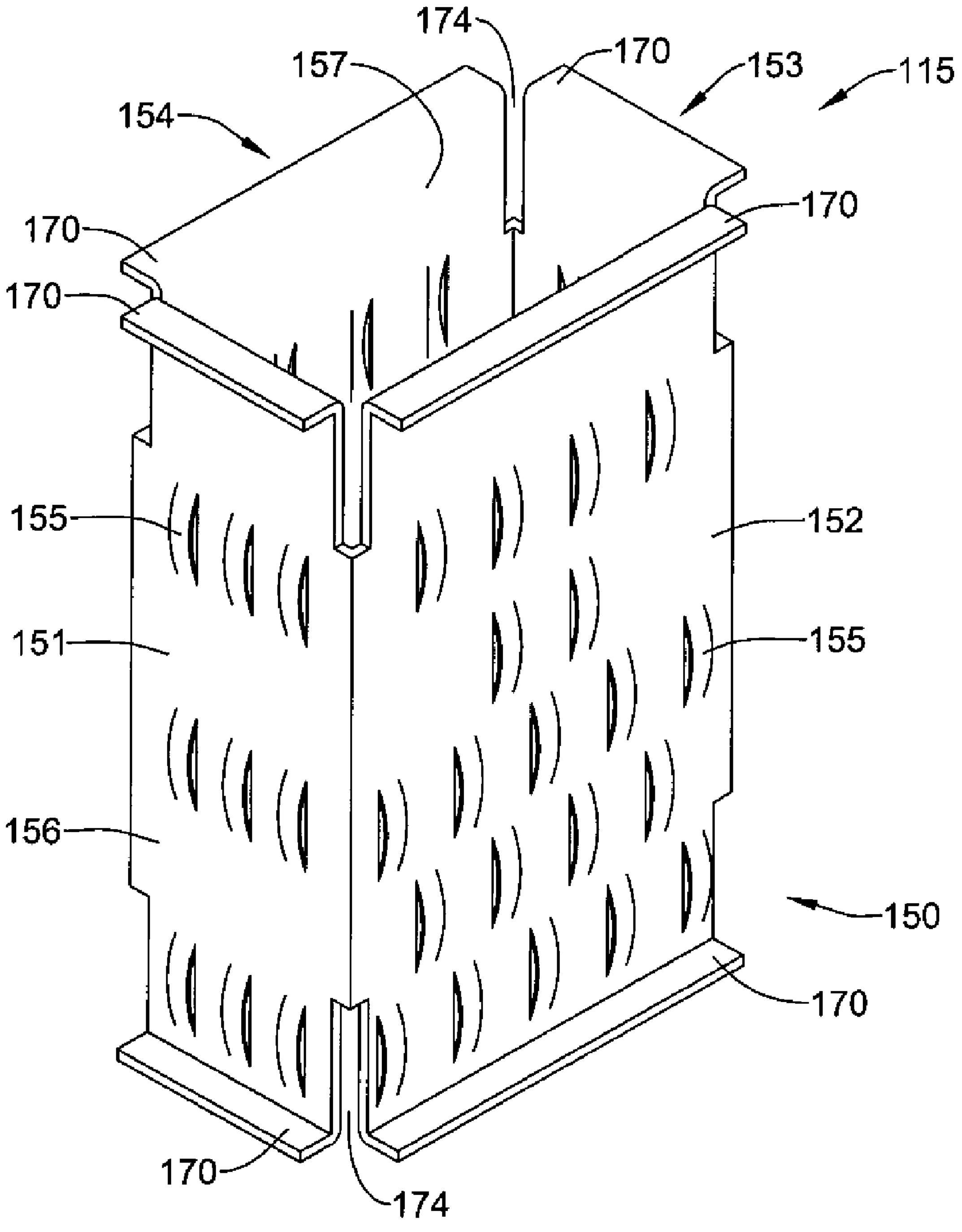
FIG. 6 is a perspective view of another illustrative resilient member for use in a brush holder assembly.

Another embodiment of a resilient member is shown in FIG. 6. The resilient member 115 may be a sleeve 150 having a plurality of sidewalls. For example, the sleeve 150 may have a first sidewall 151, a second sidewall 152, a third sidewall 153, and a fourth sidewall 154. Similar to the sleeve 50, the sleeve 150 may have a peripheral wall, which may be a continuous peripheral wall or a discontinuous peripheral wall, having an outer surface 156 and an inner surface 157. The inner surface 157 may be configured and adapted for sliding engagement, such as bi-directional, for example up and down, sliding engagement, with a brush 30.

The sleeve 150 may include one, two, three, four, or more flanges 170. As shown in FIG. 6, the top and/or bottom of the first sidewall 151 may be flanged outward, the top and/or bottom of the second sidewall 152 may be flanged outward, the top and/or bottom of the third sidewall 153 may be flanged outward, and/or the top and/or bottom of the fourth sidewall 154 may be flanged outward. The sidewalls 151, 152, 153, 154 may be flanged outward at any desired angle. In some embodiments the sidewalls 151, 152, 153, 154 may be flanged outward at about 45 degrees, at about 90 degrees, or at about 45 to about 90 degrees, or more or less, as desired. The flange 170 may be configured to fit over, engage, and/or abut the top edge 25 of the brush box 20 and/or the bottom edge 26 of the brush box 20. Thus, in some embodiments, the sleeve 150 may extend entirely through the brush box 20 from the top edge 25 to the bottom edge 26.

As shown in FIG. 6, an upper portion and/or a lower portion of two or more of the sidewalls 151, 152, 153, 154 may be disconnected or relieved from a portion of an adjacent sidewall 151, 152, 153, 154. Thus, a slot or notch 174 may extend along a portion of the edge between adjacent sidewalls 151, 152, 153, 154. The slot or notch 174 may allow an upper and/or lower portion of one or more of the sidewalls 151, 152, 153, 154 to deflect or flex inward. In some embodiments, the upper and/or lower portion of the sidewalls 151, 152, 153, 154 which are relieved from an adjoining sidewall 151, 152, 153, 154 may be flexed inward as the sleeve 150 is being disposed in a brush box 20. Thus, the outer extents of the flanges 170 may be reduced in order to insert the sleeve 150 through the brush box 20. Once properly positioned in the brush box 20, the sidewalls 151, 152, 153, 154 may return to a normal unbiased position. In other embodiments, the flanges 170 may be formed in the sleeve 150 after the sleeve 150 has been disposed in a brush box 20.

The sleeve 150 may also include a plurality of resilient tabs 155 extending outward from the peripheral wall at an angle, such as an oblique angle or a perpendicular angle. The sleeve 150, or a portion thereof, may be a monolithic member (e.g., a unitary member having a continuous molecular structure) including the resilient tabs 155, or the resilient tabs 155 may be separately manufactured and subsequently attached to the sleeve 150. As shown in FIG. 6, each sidewall 151, 152, 153, 154 may include a plurality of resilient tabs 155. The resilient tabs 155 may be similar to the resilient tabs 55, or the resilient tabs 155 may be dissimilar. The resilient tabs 155 may be formed during a manufacturing process. In some embodiments, the resilient tabs 155 may be punched, stamped, pressed, cut, or otherwise formed from the sidewalls 151, 152, 153, 154. The plurality of resilient tabs 155 may be positioned uniformly throughout each sidewall 151, 152, 153, 154, or the resilient tabs 155 may be positioned non-uniformly. For example, there may be a higher concentration (i.e., more resilient tabs 155 per unit area) nearer one end of a sidewall 151, 152, 153, 154, and a lower concentration (i.e., fewer resilient tabs 155 per unit area) near the other end of a sidewall 151, 152, 153, 154. Thus, a sidewall 151, 152, 153, 154 may have a higher concentration of tabs 155 near one end than the concentration of tabs 155 near an opposing end.

In some embodiments, the concentration of resilient tabs 155, such as the high concentration of resilient tabs 155 near one end, such as the lower end (i.e., the end closest to the conductive surface 12), may provide a sufficient electrically conductive pathway between the brush 30 and the brush box 20 to pass the electrical current passing through the brush 30. Since the distance between the conductive surface 12 and the resilient tabs 155 does not appreciably change throughout the duration of wear life of the brush 30, the electrical current pathway passing through the brush 30 may remain relatively uniform throughout the wear life of the brush 30. In some embodiments, the inner surface 157 of the sleeve 150 may contact the brush 30 over a large surface area. In some embodiments, the brush 30 may contact the sleeve 150 over a majority of the inner surface 157 of the sleeve 150 and/or the inner surface 157 of the sleeve 150 may contact the brush 30 over a majority of the surface area of one or more side surfaces 31, 32, 33, 34 of the brush 30. In other embodiments, a substantial portion of the inner surface 157, may contact the brush 30 over a large surface area. For example, about 25%, about 30%, about 40%, about 50%, about 60%, about 75%, or more of the inner surface 157 of the sleeve 150 may contact the brush 30. Additionally or alternatively, about 25%, about 30%, about 40%, about 50%, about 60%, about 75%, or more of one or more of the side surfaces 31, 32, 33, 34, of the brush 30 may contact the inner surface 157 of the sleeve 150. Thus, the sleeve 150 may contact the brush 30 over a large surface area so as not to adversely wear or erode the brush 30.

Figure 7:
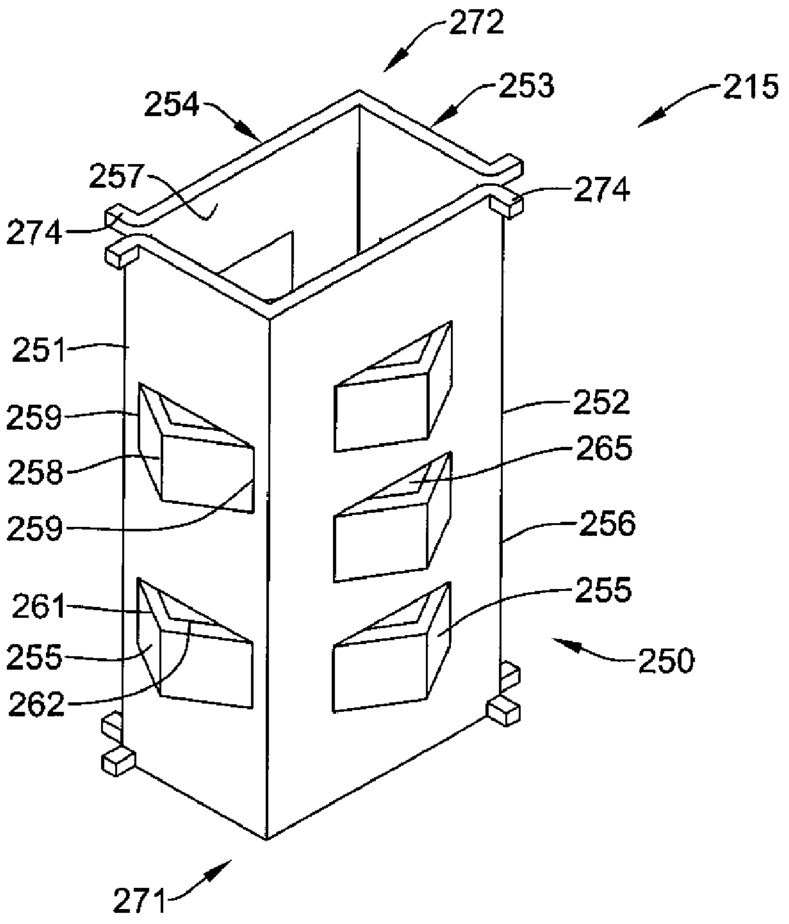
FIG. 7 is a perspective view of another illustrative resilient member for use in a brush holder assembly.

Another embodiment of a resilient member 215, which may be a liner 250, is shown in FIG. 7. The liner 250 may comprise one or a plurality of inserts attached or unattached to one another. For example, the liner 250, as shown in FIG. 7, includes two inserts 271, 272. Each insert 271, 272 may include one or more sidewalls 251, 252, 253, 254. In this exemplary embodiment, the first insert 271 includes the first sidewall 251 and the second sidewall 252, and the second insert 272 includes the third sidewall 253 and the fourth sidewall 254. However, the liner 250 may include one, two, three, four, or more inserts, wherein each insert includes one, two, three, four or more sidewalls. Similar to the sleeve 50 or the sleeve 150, the insert 250 includes an outer surface 256 including a plurality of tabs 255 configured to contact the inner surface of a brush box 20 and an inner surface 257 configured to contact the one or more side surfaces of a brush 30. In some embodiments, the inner surface 257 may be configured and adapted for sliding engagement, such as bi-directional sliding engagement, with a brush 30.

The liner 250 may include a plurality of resilient tabs 255 extending from the outer surface 256 of the liner 250. The resilient tabs 255 may be similar to the resilient tabs 55 and/or 155, or the plurality of resilient tabs 255 may be dissimilar. One or more resilient tabs 255 may extend outward from the outer surface 256 of one or more of the sidewalls 251, 252, 253, 254 of the liner 250. Thus, a plurality of resilient tabs 255 may extend outward from the outer surface 256 of the liner 250 and be configured to engage with the inner surface 27 of the brush box 20. The resilient tabs 255 may extend outward from the outer surface 256 at an angle, such as an oblique angle or a perpendicular angle, to the outer surface 256 of the liner 250. Each resilient tab 255 may include a middle portion 258 protruding from the outer surface 256 of the sidewall 251, 252, 253, 254 and root ends 259 attached to the sidewall 251, 252, 253, 254. The root ends 259 of the resilient tab 255 may be attached to the sidewall 251, 252, 253, 254 by welding, brazing, soldering, adhesive, mechanical fasteners, molding, or other attachment means.

In some embodiments, the two root ends 259 may be integrated with the sidewall 251, 252, 253, 254 of the liner 250. In other words, the sleeve 250, or a portion thereof, may be a monolithic member (e.g., a unitary member having a continuous molecular structure) including the resilient tabs 255. For example, the liner 250, which may be formed from sheet metal, may be formed during a manufacturing process to provide the resilient tabs 255. In some embodiments, the resilient tabs 255 may be punched, stamped, pressed, cut, or otherwise formed from the sidewall 251, 252, 253, 254. Thus, in some embodiments, the resilient tabs 255, similar to tabs 55, may include one smooth and/or rounded edge 261, which may be an outer edge, and a second sharp and/or jagged edge 262, which may be an inner edge, as a result of a shearing force during a forming process. The tabs 255 may undergo an additional manufacturing process to polish and/or smooth the sharp and/or jagged edge 262, as well as help create a non-particulating surface. For example, the tabs 55 may be subjected to an electropolishing process, an electroplating process, a burnishing process, a polishing process, a grinding process, or other process to provide a polished surface. Additionally, the sidewalls 251, 252, 253, 254 may include one or more openings 265 corresponding to the one or more resilient tabs 255 projecting from the sidewalls 251, 252, 253, 254.

Additionally, the liner 250 may include a securing structure, such as one or more protrusions 274 extending from the liner 250. The one or more protrusions 274 may be configured and adapted to engage with, fit over or through, mate with, and/or abut a portion of the brush box 20. For example, the one or more protrusions 274 may engage with and be disposed in one or more notches or slots (not shown) of the brush box 20. The one or more protrusions 274 may impede the liner 250 from being dislocated from the brush box 20 during operation. Insertion of the brush 30 in the liner 250 may force the liner 250 into engagement with the brush box 20 and prevent disengagement of the liner 250 from the brush box 20.

Figure 8:
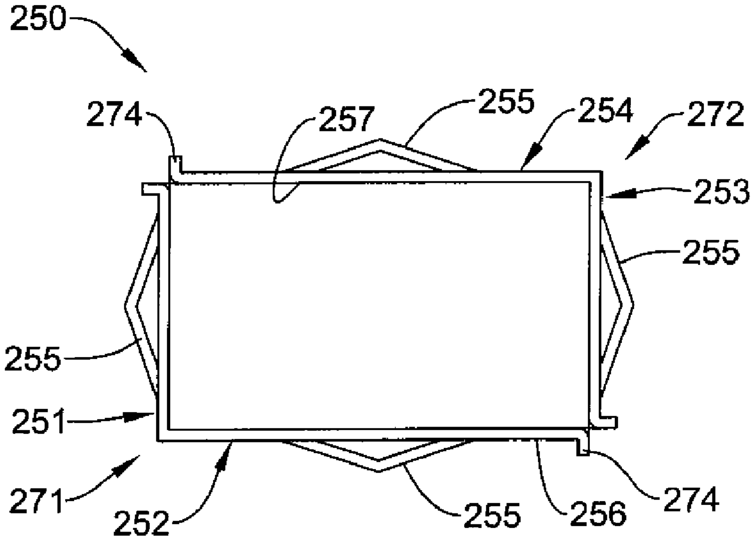
FIG. 8 is a top view of the illustrative resilient member shown in FIG. 7.

FIG. 8 is a top view of the liner 250 shown in FIG. 7. As shown in FIG. 8, the tabs 255 extend outward from the outer surface of the liner 250. In some embodiments, the sidewalls 251, 252, 253, 254 may include planar inner surfaces 257 and/or planar outer surfaces 256 except for the protruding resilient tabs 255. The sidewalls 251, 252, 253, 254 may be positioned perpendicular to one another. Therefore, when positioned in a brush box 20, the inserts 271, 272 may form an open-ended box structure. In some embodiments, the inner surface 257 of the liner 250 may contact the brush 30 over a large surface area. In some embodiments, the brush 30 may contact the liner 250 over a majority of the inner surface 257 of the liner 250 and/or the inner surface 257 of the liner 250 may contact the brush 30 over a majority of the surface area of one or more side surfaces 31, 32, 33, 34 of the brush 30. In other embodiments, a substantial portion of the inner surface 257, may contact the brush 30 over a large surface area. For example, about 25%, about 30%, about 40%, about 50%, about 60%, about 75%, or more of the inner surface 257 of the liner 250 may contact the brush 30. Additionally or alternatively, about 25%, about 30%, about 40%, about 50%, about 60%, about 75%, or more of one or more of the side surfaces 31, 32, 33, 34, of the brush 30 may contact the inner surface 257 of the liner 250. Thus, the liner 250 may contact the brush 30 over a large surface area so as not to adversely wear or erode the brush 30.

Figure 9:
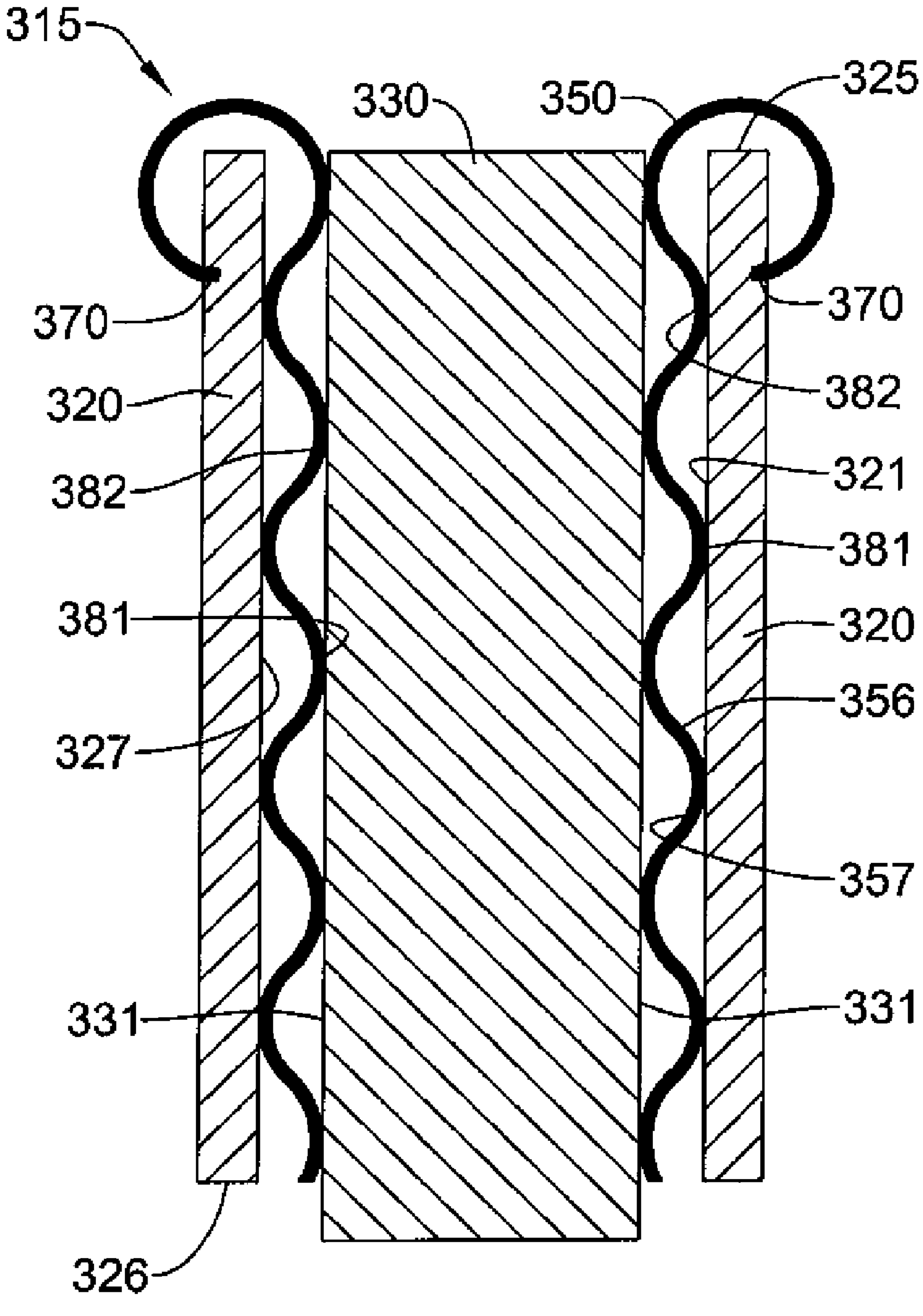
FIG. 9 is a cross-sectional view of a brush holder assembly including an illustrative resilient member.

Another exemplary embodiment of a resilient member disposed in a brush holder assembly 10 is shown in FIG. 9. The resilient member 315 may include one or more corrugated members 350 interposed between at least a portion of the brush 330 and at least a portion of a brush holder, such as the brush box 320. For example, the corrugated member(s) 350 may be disposed between the inner surface 327 of the brush box 320 and the outer surface 331 of the brush 330. In some embodiments, the corrugated member(s) 350 may contact at least a portion of each side surface of the brush 330. Thus, the corrugated member(s) 350 may separate or isolate the brush 330 from the brush box 320. In some embodiments, the corrugated member(s) 350 may extend entirely around the side surfaces of the brush 330, thus completely isolating the brush 330 from the brush box 320. As shown in FIG. 9, the corrugated member(s) 350 may extend entirely through the brush box 320 from the top edge 325 of the brush box 320 to the bottom edge 326 of the brush box 320, or the corrugated member(s) 350 may extend through a portion of the brush box 320.

The corrugated member(s) 350 includes one or more undulating or wavy surfaces. For example, the corrugated member (s) 350 may include an undulating inner surface 357 and/or an undulating outer surface 356. In other words, the corrugated member(s) 350 may have alternating peaks 381 and valleys 382. The peaks 381 of the inner surface 357 may contact the outer surface 331 of the brush 330 and the peaks 381 of the outer surface 356 may contact the inner surface 327 of the brush box 320. Thus, the brush 330 may be in sliding contact, such as bi-directional sliding contact, with the corrugated member(s) 350. The undulations in the corrugated member(s) 350 may extend in any desired direction. For example, the corrugations, as shown in FIG. 9, may extend in a horizontal direction. However, in other embodiments, the corrugations may extend in a vertical direction, a diagonal direction, or other irregular direction. In some embodiments, the corrugated member(s) 350 may be sufficiently flexible or resilient to absorb movement of the brush 330 relative to the brush box 320.

In some embodiments, a portion of the corrugated member (s) 350 may be configured and adapted to engage with, fit over or through, mate with, and/or abut a portion of the brush box 320. For example, a portion of the corrugated member(s) 350 may engage with and be disposed in one or more notches or slots 370 of the brush box 320. The one or more notches or slots 370 may impede the corrugated member 350 from being dislocated from the brush box 320 during operation. The corrugated member(s) 350 may engage with, fit over or through, mate with, and/or abut a portion of the brush box 320 near the top edge 325 of the brush box 320 and/or a portion of the brush box 320 near the bottom edge 326. It is contemplated that other configurations may be used to impede dislocation of the corrugated member(s) 350 from the brush box 320. For example, hooks, clips, fasteners, an abutting surface, welding, brazing, soldering, or the like, may be used to impede dislocation of the corrugated member(s) from the brush box 320.

Figure 10:
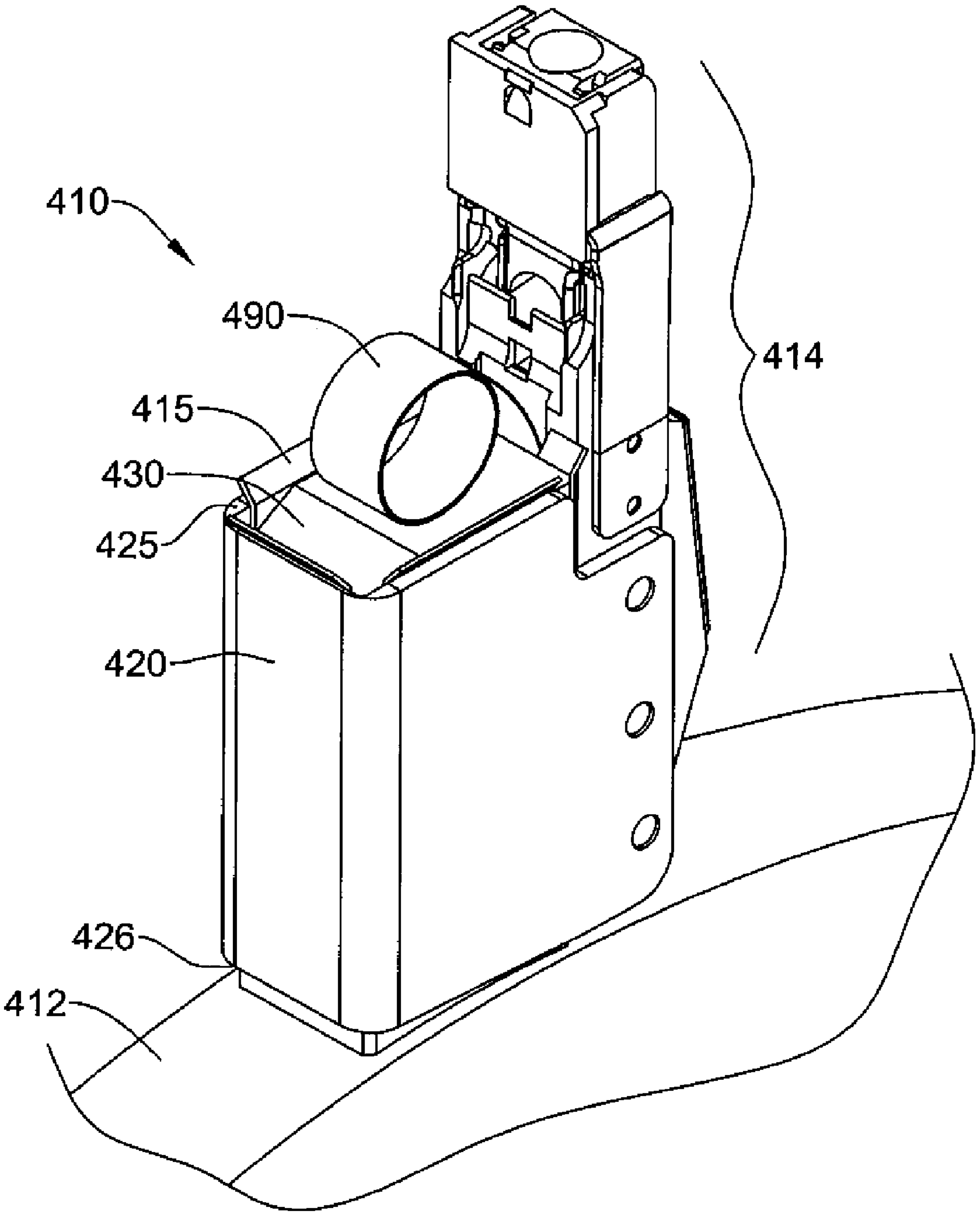
FIG. 10 is a perspective view of another illustrative brush holder assembly.

FIG. 10 shows another exemplary embodiment of a brush holder assembly 410. The brush holder assembly 410 may substantially resemble a brush holder assembly as described in U.S. patent application Ser. No. 10/322,957, entitled "Brush Holder Apparatus, Brush Assembly, and Method", which is herein incorporated by reference in its entirety.

The brush holder assembly 410 includes a brush holder, such as a brush box 420, surrounding a brush 430 on several sides. The brush box 420 may be secured to a mounting portion 414 configured and adapted to be mounted to another structure. The brush box 420 may enclose the brush 430 on three sides and the mounting portion 414 may enclose the brush 430 on the fourth side of the brush 430. As used herein, the mounting portion 414 may be considered a portion of the brush box 430 as the mounting portion 414 further encloses the brush 430. The brush holder assembly 410 is configured to place the brush 430 in contact with a conductive surface 412, such as a rotating surface of a collector ring, slip ring, or a commutator, and conduct current therefrom. The brush 430 may extend from the lower edge 426 of the brush box 420 such that a wear surface of the brush 430 engages the conductive surface 412. The mounting portion 414 may include an over-center engagement mechanism, a slotted or channeled engagement mechanism, or other mechanism for easily engaging and disengaging the brush 430 from a conductive surface 412. Also illustrated in FIG. 10 is a brush spring 490, such as a constant force spring, which provides tension to the brush 430 to bias the brush 430 toward and in contact with the conductive surface 412. The spring 490 may be attached to a portion of the brush box 420 or the mounting portion 414 of the brush holder assembly 410, for example. In some embodiments, the spring 490 may extend along one side surface of the brush 430 between the brush 430 and the mounting portion 414 of the brush holder assembly 410.

A resilient member 415 may be positioned between at least a portion of the brush 430 and at least a portion of the brush box 420. For example, the resilient member 415 may separate or isolate one or more sides of the brush 430 from the inner surface of the brush box 420 and/or the mounting portion 414. In some embodiments, additional resilient members may be positioned between the brush 430 and the inner surface of the brush box 420 and/or the mounting portion 414. Thus, one or more of the sides of the brush 430 may be spaced from or free of the inner surface of the brush box 420 and/or the mounting portion 414. In some embodiments, each side surface of the brush 430 may be spaced away from or free of direct contact with the inner surface of the brush box 420. The brush 430 may be in sliding contact, such as bi-directional sliding contact, with the inner surface of the resilient member 415.

The resilient member 415 may comprise any desired material. For example, the resilient member 415 may comprise a conductive material, an insulative material, or a semiconductive material as described above. In some embodiments, the resilient member 415 may include a conductive material, including, but not limited to, those materials listed above. For example, the resilient member 415 may comprise aluminum, beryllium, brass, chromium, copper, gold, iron, nickel, palladium, platinum, silver, tin, tungsten, or alloys thereof, or the like. In some embodiments, the resilient member 415 may be copper or a copper alloy, for example, a beryllium copper material. Thus, the resilient member 415 may provide an electrically conductive pathway between the outer surface of the brush 430 and the inner surface of the brush box 420. In some embodiments wherein the resilient member 415 is used to provide an electrically conductive pathway between the brush 430 and the brush box 420, a shunt or wire, conventionally extending from the brush 430 to provide an electrically conductive pathway may be absent. Thus, in some embodiments, the resilient member 415 may replace a shunt or wire extending from the brush, typically found in many conventional assemblies.

In other embodiments, wherein the resilient member 415 is not intended to provide an electrically conductive pathway, the resilient member 415 may comprise an insulative or a semiconductive material, such as those described above or others generally known in the art.

Additionally or alternatively, the resilient member 415 may provide a resilient interface between the inner surface of the brush box 420 and the outer surface of the brush 430. The resiliency of the resilient member 415 may reduce or eliminate the brush 430 from impacting the inner surface of the brush box 420, thus reducing or eliminating the formation of deposits, such as brush material deposits or other deposits, between the brush 430 and the brush box 420. The resilient member 415 may space apart at least a portion of the inner surface of the brush box 420 and/or a portion of the mounting portion 414 from the outer surface of the brush 430, such that deposits are not compacted between the brush 430 and the brush box 420 and/or mounting portion 414. Furthermore, the resilient member 415 may absorb vibrations, deflections, shifts, or other movements of the brush 430 within the brush box 420. Additionally, the resilient member 415 may flexibly support the brush 430 within the brush box 420, thereby allowing the wear surface of the brush 430 to better follow and/or ride on the conductive surface 412, which may include structure and/or irregularities that cause the brush to move.

In some embodiments, the resilient member 415 may be a removable and/or replaceable component of the brush holder assembly 410. Therefore, the resilient member 415 may be readily replaced as desired. For example, the resilient member 415 may be replaced when a new brush 430 is substituted into the assembly 410 or during scheduled or unscheduled maintenance of the assembly 410. The resilient member 415 may extend entirely through the brush box 420 from the top edge 425 of the brush box 420 to the bottom edge 426 of the brush box 420, or a portion thereof.

Figure 11:
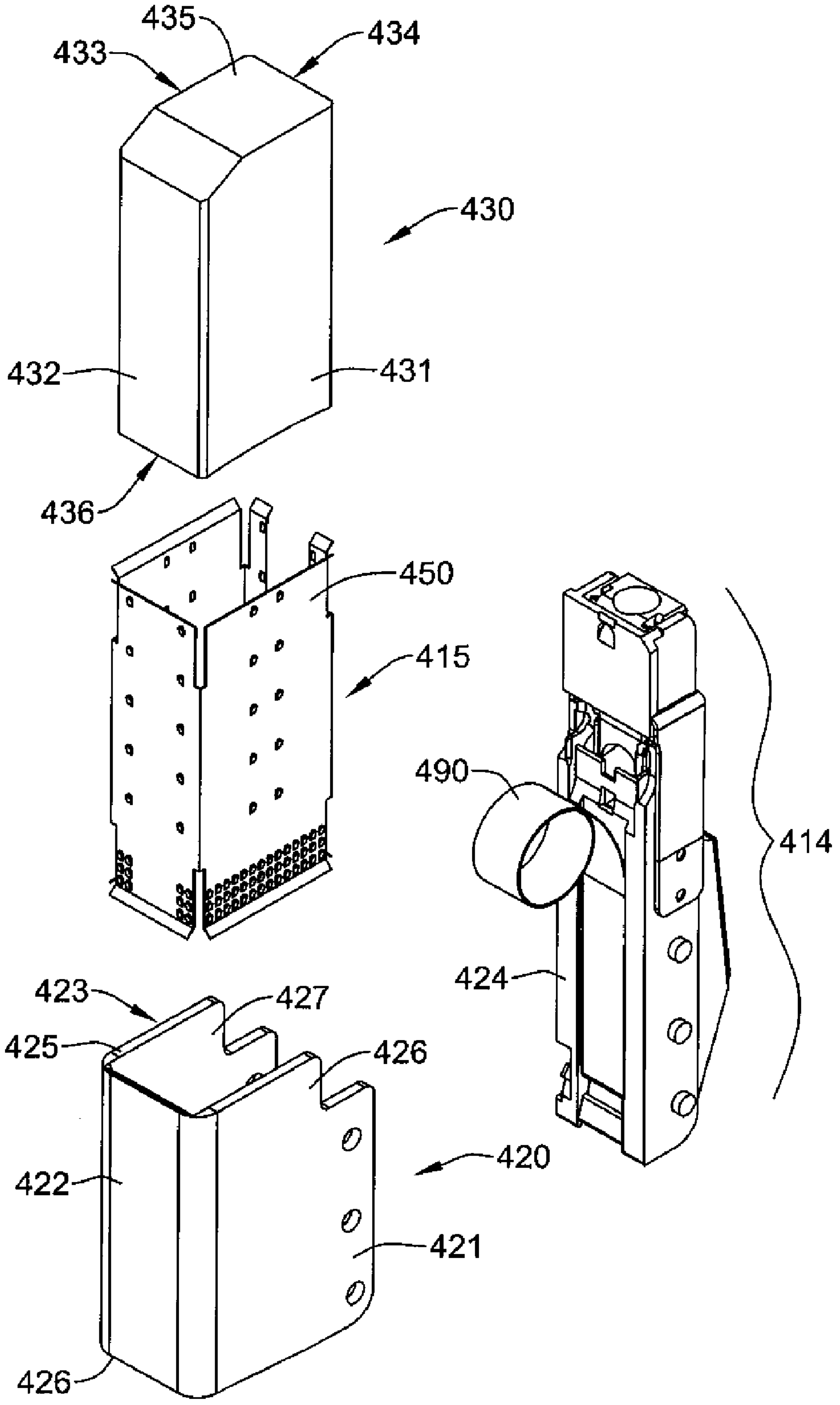
FIG. 11 is an exploded view of the illustrative brush holder assembly shown in FIG. 10.

FIG. 11 shows an exploded view of the brush holder assembly 410. The brush 430 may have any desired shape, such as a cylinder, a block, a cone, a wedge, or the like. For instance, as shown in FIG. 11, the brush 430 may be a block having a top surface 435, a bottom surface 436 (i.e., a wear surface), and a plurality of side surfaces. The brush 430 may have a first side surface 431, a second side surface 432, a third side surface 433, and a fourth side surface 434. In some embodiments, the plurality of side surfaces may be planar surfaces, concave surfaces, convex surfaces, or combinations thereof. In some embodiments, the brush 430 may comprise a carbon or carbon composite material. In some embodiments, the brush 430 may be a non-metallic graphite composite block.

The brush box 420 may have a top edge 425 and a bottom edge 426. As shown in FIG. 11, the brush box 420 may have a plurality of sidewalls, for example, a first sidewall 421, a second sidewall 422, and a third sidewall 423. The mounting portion 414 attached to the brush box 420 may define a fourth sidewall 424, thus enclosing the brush 430. Therefore, the plurality of sidewalls 421, 422, 423, 424 may define an inner surface 427 and an outer surface 426 of the brush box 420.

Figure 12:
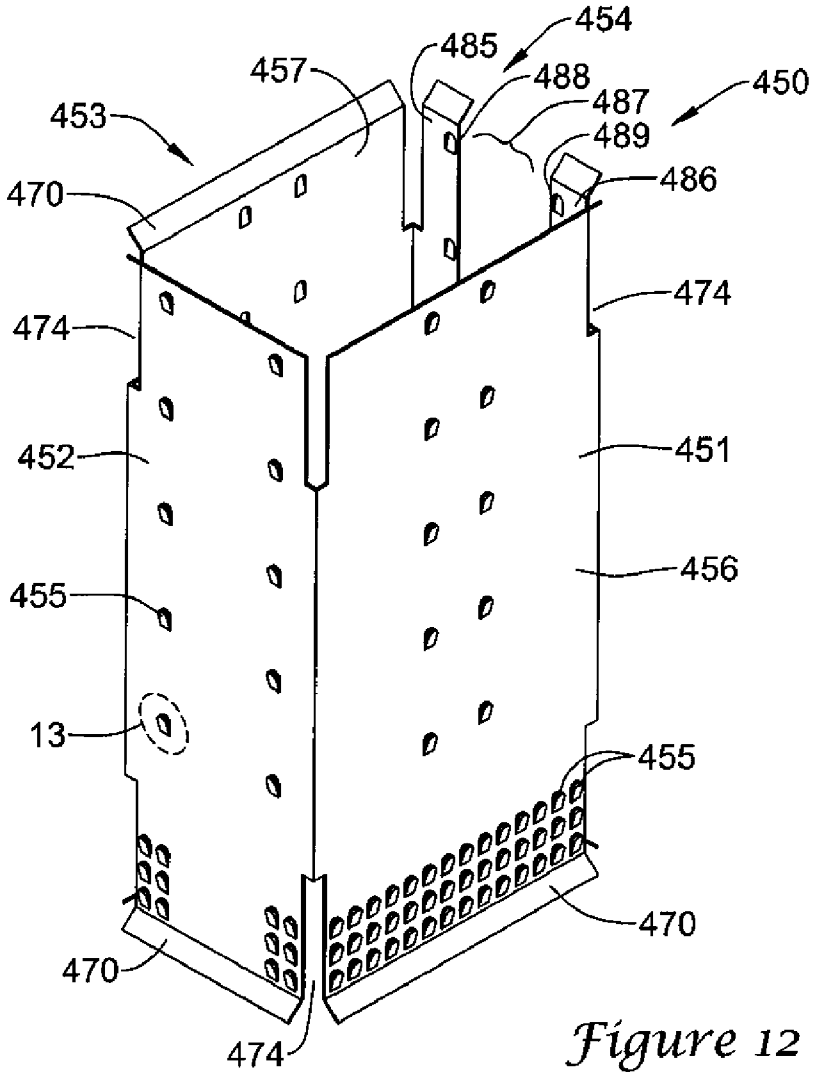
FIG. 12 is a perspective view of an illustrative resilient member for use in a brush holder assembly.

The resilient member 415 of the brush holder assembly 410 may be positioned between the brush 430 and the brush box 420. The resilient member 415 may be an open-ended or tubular member, such as a sleeve 450. As shown in FIG. 12, the sleeve 450 may include a plurality of sidewalls. For instance, the sleeve 450 may include a first sidewall 451, a second sidewall 452, a third sidewall 453, and a fourth sidewall 454. The fourth sidewall 454 may be discontinuous, having a first portion 485 and a second portion 486 separated by a gap 487. The first portion 485 may have an edge 488 extending from one end of the sleeve 450 to the opposite end of the sleeve 450 and the second portion 486 may have an edge 489 extending from one end of the sleeve 450 to the opposite end of the sleeve 450. Thus, the gap 487 may be defined between the edges 488, 489. In some embodiments, the gap 487 may provide clearance for the spring 490 to extend along the fourth side 434 of the brush 430, between the brush 430 and the mounting portion 414. Thus, the sleeve 450 may include a plurality of sidewalls forming a U-shape, such as a U-shape having serifs. Therefore, the sleeve 450 may contact at least a portion of each side surface 431, 432, 433, 434 of the brush 430, such that each of the side surfaces 431, 432, 433, 434 of the brush 430 are spaced away from or isolated from the inner surface 427 of the brush box 420 and/or the mounting portion 414.

The sleeve 450 may have an outer surface 456 and an inner surface 457. The inner surface 457 may be configured and adapted for sliding engagement, such as bi-directional sliding engagement, with the brush 430. For example, the brush 430 may be slidably disposed relative to and/or within the sleeve 450 such that the brush 430 may slide in at least two directions, for example, up and down (e.g. toward and away from the conductive surface 412), relative to and/or within the sleeve 450.

A plurality of resilient tabs 455 may extend outward from the outer surface 456 of one or more sidewalls 451, 452, 453, 454 of the sleeve 450 and be configured for engagement with the inner surface 427 of the brush box 420. The resilient tabs 455 may extend outward from the outer surface 456 at an angle, such as an oblique angle or a perpendicular angle, to the outer surface 456 of the sleeve 450. In some embodiments, the resilient tabs 455 may extend outward from the outer surface 456 at about 10 degrees, at about 20 degrees, at about 30 degrees, or in the range of about 10 degrees to about 30 degrees, or more or less, as desired.

In some embodiments, the sleeve 450 may include a sufficient number of resilient tabs 455 in order to direct the electrical current passing through the brush 430. Thus, the number of resilient tabs 455 necessary to pass a specified electrical current between the brush 430 and the brush box 420 may be dictated by the combined cross-sectional area and/or surface area of the tabs 455 in contact with the inner surface 427 of the brush box 420. In some embodiments, the sleeve 450 may include 1, 2, 3, 4, 8, 16, 24, 40, 80, or more resilient tabs 455.

Figure 13:
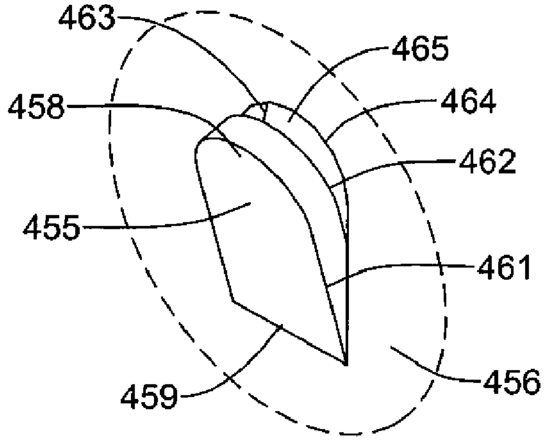
FIG. 13 is an enlarged view of a resilient tab of the illustrative resilient member shown in FIG. 12.

As shown in FIG. 13, each resilient tab 455 may include a portion 458 protruding from the outer surface 456 of the sidewall 451, 452, 453, 454 and a root end 459 attached to the sidewall 451, 452, 453, 454. In some embodiments, the root end 459 may be attached to the sidewall 451, 452, 453, 454 by welding, brazing, soldering, adhesive, mechanical fasteners, molding, or other attachment means.

In some embodiments, the root end 459 of the resilient tabs 455 may be integrated with the sidewall 451, 452, 453, 454 of the sleeve 450. In other words, the sleeve 450, or a portion thereof, may be a monolithic member (e.g., a unitary member having a continuous molecular structure) including the resilient tabs 455. For example, the sleeve 450, which may be formed from sheet metal, may be formed during a manufacturing process to provide the resilient tabs 455. In some embodiments, the resilient tabs 455 may be punched, stamped, pressed, cut, or otherwise formed from the sidewalls 451, 452, 453, 454. In some embodiments, an edge of the resilient tabs 455 may be separated or severed from the sidewall 451, 452, 453, 454 of the sleeve 450, thus forming a corresponding opening 465 in the sidewall 451, 452, 453, 454. In other embodiments, the resilient tabs 455 may be pressed outward but not severed from the sidewall 451, 452, 453, 454. Thus, the resilient tabs 455 may resemble dimples or indentations from the inner surface 457 and extending outward from the outer surface 456, forming protrusions in the sidewall 451, 452, 453, 454.

As shown in FIG. 13, one edge 461 of a resilient tab 455, which may be an outer edge configured for engagement with the inner surface 427 of the brush box 420, may be smooth and/or rounded and a second edge 462 of a resilient tab 455, which may be an inner edge, may be sharp and/or jagged as a result of forming the resilient tab 455 using a shearing force. The smooth and/or rounded edge 461 corresponds to the outer surface of the resilient tab 455 extending from the sleeve 450, and the sharp and/or jagged edge 462 corresponds to the inner surface of the resilient tab 455 extending from the sleeve 450. Correspondingly, the opening 465 extending through the peripheral wall of the sleeve 450 may include a smooth and/or rounded edge 463 on the inner surface 457 of the sleeve 450 and a sharp and/or jagged edge 464 on the outer surface 456 of the sleeve 450. The sharp and/or jagged edges 462, 464 define the last interface between the sidewall 451, 452, 453, 454 and the resilient tab 455 prior to severing the resilient tab 455 from the sidewall 451, 452, 453, 454. Thus, the sharp and/or jagged edges 462, 464 may be formed due to the small amount of deformation from tensile shearing forces prior to fracture. The resilient tab 455 may undergo an additional manufacturing process to polish and/or smooth the sharp and/or jagged edges 462, 464, as well as help create a non-particulating surface. For example, the tabs 455 may be subjected to an electropolishing process, an electroplating process, a burnishing process, a polishing process, a grinding process, or other process to provide a polished surface.

Again referring to FIG. 12, in some embodiments, there may be a higher concentration of resilient tabs 455 (i.e., more resilient tabs 455 per unit area) nearer one end of the sleeve 450 and a lower concentration of resilient tabs 455 (i.e., fewer resilient tabs 455 per unit area) near the other end of the sleeve 450. However, in other embodiments, the plurality of resilient tabs 455 may be positioned uniformly throughout the sleeve 450. In some embodiments, the concentration of resilient tabs 455 may provide a sufficient electrically conductive pathway between the brush 430 and the brush box 420 to pass the electrical current passing through the brush 430. Since the distance between the conductive surface 412 and the resilient tabs 455 does not appreciably change throughout the duration of wear life of the brush 430, the electrical current pathway passing through the brush 430 may remain relatively uniform or constant throughout the wear life of the brush 430.

In some embodiments, the sleeve 450 may include a securing structure to impede the sleeve 450 from sliding in the brush box 420 after positioning the sleeve 450 in the brush box 420. For example, the sleeve 450 may include flanges 470. The sleeve 450 may include one, two, three, four, five, or more flanges 470. As shown in FIG. 12, the first sidewall 451 may be flanged outward, the second sidewall 452 may be flanged outward, the third sidewall 453 may be flanged outward, the first portion 486 of the fourth sidewall 454 may be flanged outward, and/or the second portion 487 of the fourth sidewall 454 may be flanged outward. The sidewalls 451, 452, 453, 454 may be flanged outward at any desired angle. In some embodiments, the flanges 470 may extend outward at about 45 degrees, at about 90 degrees, or at about 45 to about 90 degrees, or more or less, as desired. The flanges 470 may be configured to fit over, engage, and/or abut the top edge 425 of the brush box 420 and/or the bottom edge 426 of the brush box 420, for example.

In some embodiments, an upper portion and/or a lower portion of two or more of the sidewalls 451, 452, 453, 454 may be disconnected or relieved from a portion of an adjacent sidewall 451, 452, 453, 454. Thus, a slot or notch 474 may extend along a portion of the edge between adjacent sidewalls 451, 452, 453, 454. The slot or notch 474 may allow an upper and/or lower portion of one or more of the sidewalls 451, 452, 453, 454 to deflect or flex inward. In some embodiments, the upper and/or lower portion of the sidewalls 451, 452, 453, 454 which are relieved from an adjoining sidewall 451, 452, 453, 454 may be flexed inward as the sleeve 450 is being disposed in the brush box 420. Thus, the outer extents of the flanges 470 may be reduced in order to insert the sleeve 450 through the brush box 420. Once properly positioned in the brush box 420, the sidewalls 451, 452, 453, 454 may return to a normal unbiased position and the flanges 470 may contact the upper edge 425 and/or the lower edge 426 of the brush box 420. In other embodiments, the flanges 470 may be formed in the sleeve 450 after the sleeve 450 has been disposed in the brush box 420.

Figure 14:
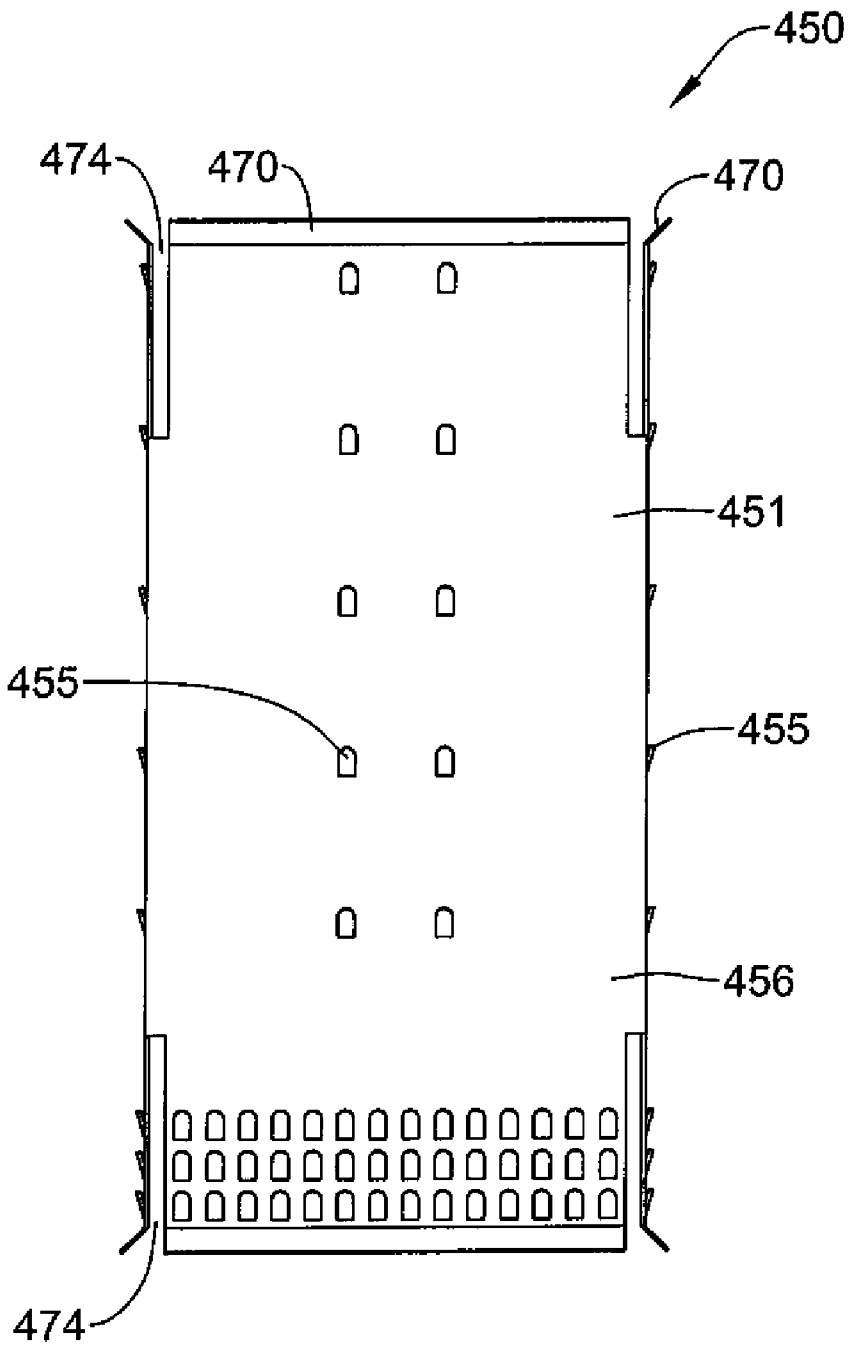
FIG. 14 is a side view of the illustrative resilient member shown in FIG. 12.

FIG. 14 is a side view of the sleeve 450 showing the first sidewall 451. A plurality of resilient tabs 455 are shown extending outward from the sleeve 450 at on oblique angle. A high concentration of resilient tabs 455, such as an array of three rows and fourteen columns of resilient tabs 455, may extend outward from the outer surface 456 near one end of the sleeve 450. Although an array of resilient tabs 455 are shown extending from the outer surface 456, any arrangement and/or quantity of resilient tabs 455 is perceivable. As shown in FIG. 14, additional resilient tabs 455 may extend from the outer surface 456 at other locations throughout the length and width of the sleeve 450. Thus, in some embodiments, the plurality of resilient tabs 455 may be in contact with the inner surface 427 of the brush box 420, but the remainder of the outer surface 456 of the sleeve 450 may not be in contact with the inner surface 427 of the brush box 420. Although not shown, the opposing third sidewall 453 may be substantially similar to the first sidewall 451, or the third sidewall 453 may be dissimilar to the first sidewall 451.

Figure 15:
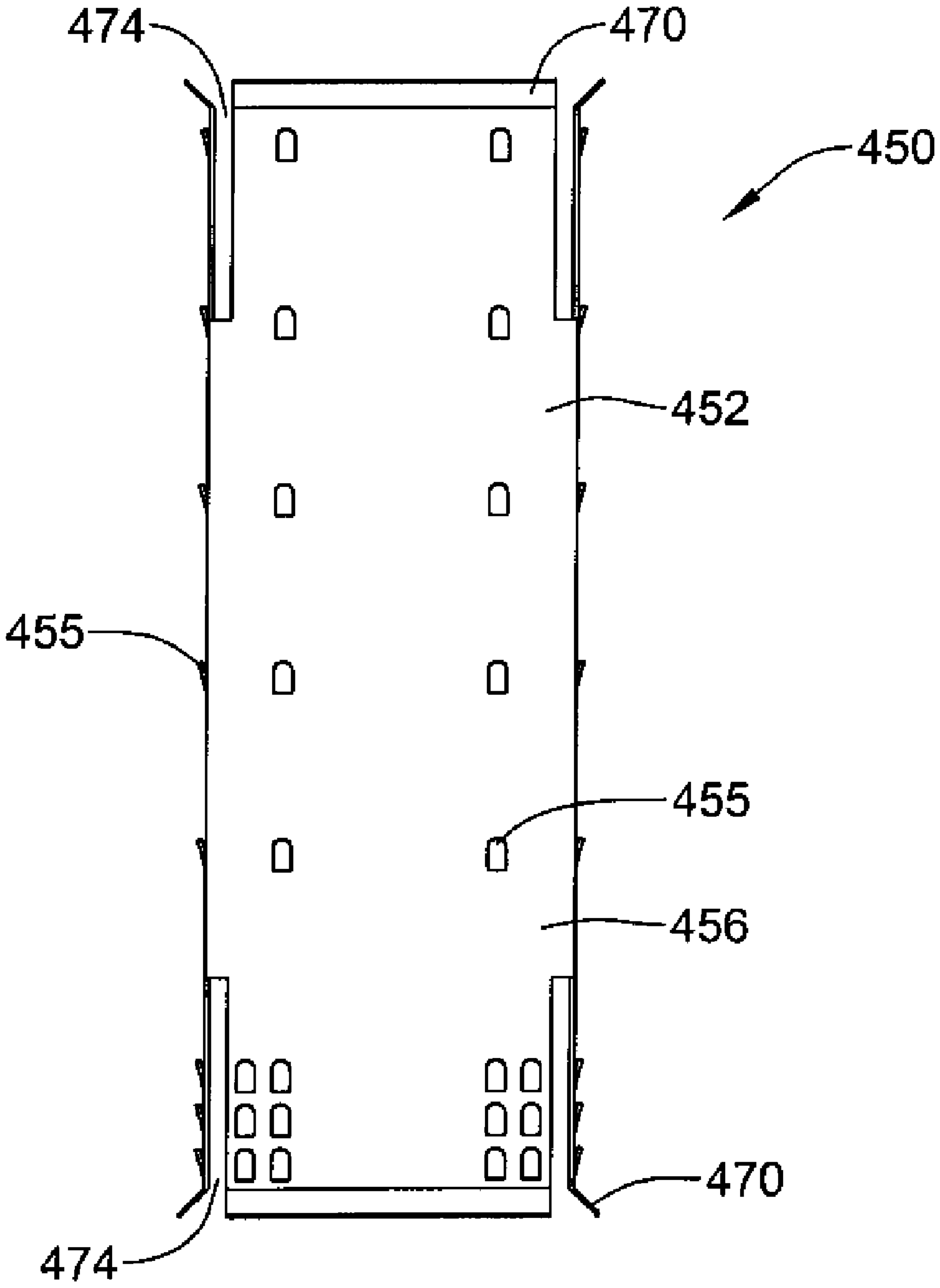
FIG. 15 is another side view of the illustrative resilient member shown in FIG. 12.

FIG. 15 is another side view of the sleeve 450 showing the second sidewall 452. The second sidewall 452 may include a plurality of resilient tabs 455 extending outward from the outer surface 456 of the sleeve 450. In some embodiments, a higher concentration of resilient tabs 455 may be positioned nearer one end of the second sidewall 452. As shown in FIG. 15, additional resilient tabs 455 may extend from the outer surface 456 at other locations throughout the length and width of the sleeve 450.

Figure 16:
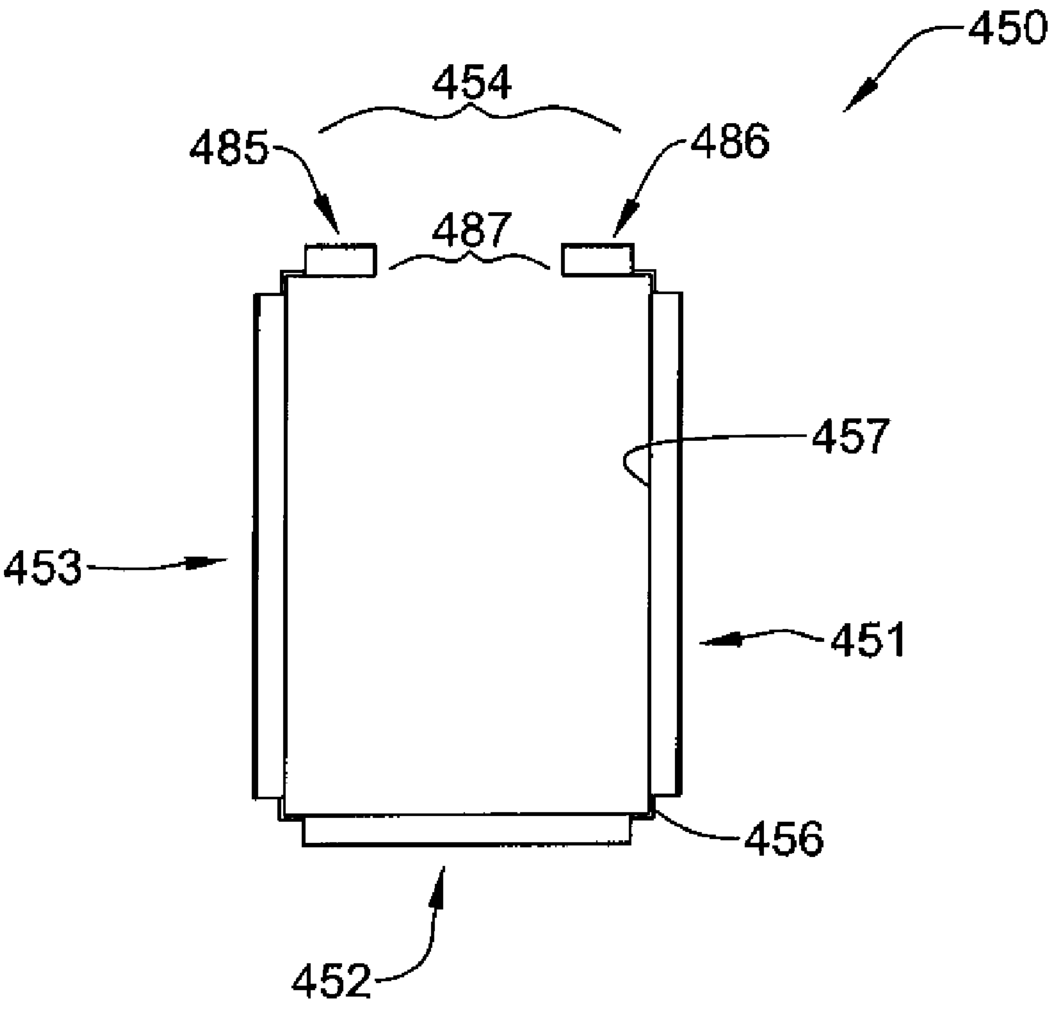
FIG. 16 is a top view of the illustrative resilient member shown in FIG. 12.

FIG. 16 a top view of the sleeve 450 in which the gap 487 extending through the fourth sidewall 454 may be shown. In some embodiments, the sleeve 450 may be a single member including the sidewalls 451, 452, 453, 454. The sidewalls 451, 452, 453, 454 may be bent, attached, or otherwise extend from an adjacent sidewall 451, 452, 453, 454 at an angle, such as a perpendicular angle. Thus, in some embodiments, the sleeve 450 may form an open-ended box structure. In some embodiments, the inner surface 457 of the sidewalls 451, 452, 453, 454 may be a planar surface and/or the outer surface 456 of the sidewalls 451, 452, 453, 454 excluding the resilient tabs 455 may be a planar surface. Although not shown in FIG. 16, one or both of the portions 485, 486 of the fourth sidewall 454 may include one or a plurality of resilient tabs 455 extending outward from the outer surface 456 of the sleeve 450.

In an assembled configuration the sleeve 450 may be inserted into a brush box 420. A brush 430 may be inserted through the sleeve 450, thereby persuading the sleeve 450 to contact the brush 430 and the brush box 420. The plurality of resilient tabs 455 may be slightly compressed against the inner surface 427 of the brush box 420 from the force provided by the brush 430 frictionally engaging the inner surface 457 of the sleeve 450. Thus, the sleeve 450 may simultaneously contact the inner surface 427 of the brush box 420 and each of the side surfaces 431, 432, 433, 434 of the brush 430. The resiliency of the tabs 455 may urge the inner surface 457 of the sleeve 450, such as the portions of the inner surface 457 of the sleeve 450 adjacent the root ends 459 of the tabs 455 into contact with the brush 430. The brush 430 may slidably contact the inner surface 457 of the sleeve 450 over a large surface area of the inner surface 457 of the sleeve 450 and/or the inner surface 457 of the sleeve 450 may slidably contact the brush 430 over a majority of the surface area of one or more side surfaces 431, 432, 433, 434 of the brush 430. In some embodiments, the brush 430 may contact a portion of, a majority of, or a substantial portion of, the inner surface 457 of the sleeve 450. Thus, the sleeve 450 may not adversely wear or erode the brush 430. For instance, about 25%, 30%, 40%, 50%, 60%, 75% or more of the inner surface 457 of the sleeve 450 may be in sliding contact with the brush 430. Additionally or alternatively, the inner surface 457 of the sleeve 450 may contact a portion of, a majority of, or a substantial portion of, the surface area of one or more of the side surfaces 431, 432, 433, 434 of the brush 430. Thus, the sleeve 450 may not adversely wear or erode the brush 430. For instance, about 25%, 30%, 40%, 50%, 60%, 75% or more of the surface area of one or more of the side surfaces 431, 432, 433, 434 of the brush 430 may be in sliding contact with the inner surface 457 of the sleeve 450. The resiliency of the resilient tabs 455 may allow the sleeve 450 to flexibly hold the brush 430 within the brush box. Thus, the sleeve 450 may be able to absorb vibrations, deflections, shifts, or other movements of the brush 430 without allowing the brush 430 to impact against the inner surface 427 of the brush box 420.

Figure 17:
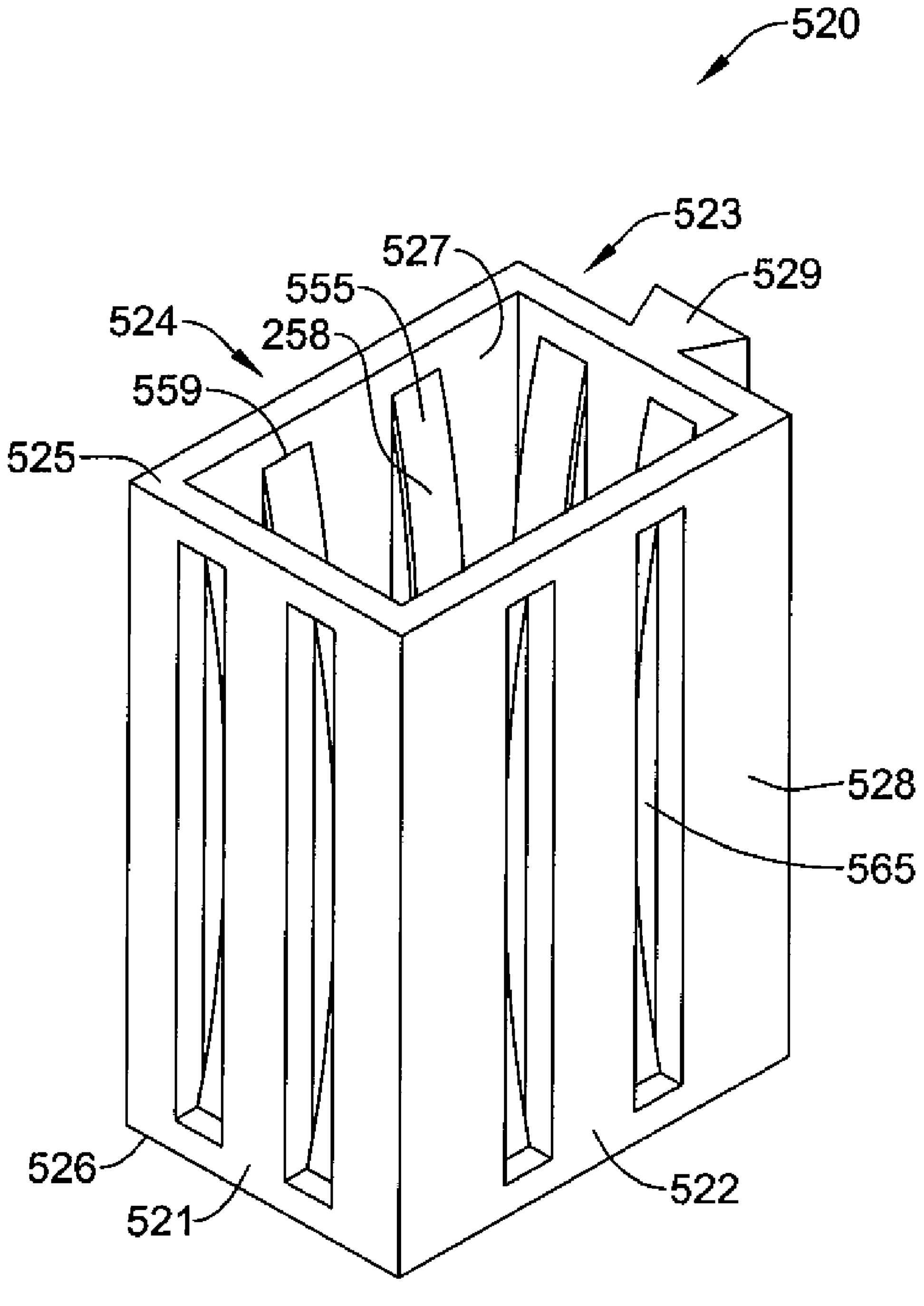
FIG. 17 is a perspective view of an another illustrative brush holder.

An alternative brush holder for a brush holder assembly is shown in FIG. 17. The brush holder, shown as a brush box 520, may be an open-ended tubular member having any desired shape. The brush box 520 may have a top edge 525 and a bottom edge 526. As shown in FIG. 17, the brush box 520 may include a plurality of sidewalls, for example, a first sidewall 521, a second sidewall 522, a third sidewall 523, and a fourth sidewall 524. The brush box 520 may include an inner surface 527 and an outer surface 528. Additionally, the brush box 520 may have a mounting portion 529 for mounting the brush box 520 to a framework. In some embodiments, the brush box 520 may be in electrical contact with a structure carrying electrical current to or from a brush.

Instead of, or in addition to, a removable resilient member, the brush box 520 may include one or a plurality of tabs 555 extending from one or more of the sidewalls 521, 522, 523, 524. For example, one or a plurality of tabs 555 may extend inward from each sidewall 521, 522, 523, 524 at an angle, such as an oblique angle or a perpendicular angle, to the inner surface 527 of the brush box 520. The tabs 555 may be similar to other tabs previously described herein, or the tabs 555 may be dissimilar. The tabs 555, as shown in FIG. 17, may be flexible or resilient, and be configured and adapted for sliding engagement with a brush, such as bidirectional sliding engagement with a brush. Thus, the tabs 555 may provide a degree of resiliency to the brush box 520 in order to absorb vibrations, deflections, shifts, or other movements of a brush.

Each tab 555 may include a middle portion 558 protruding from the inner surface 527 of a sidewall 521, 522, 523, 524 of the brush box 520 and roots ends 559 attached to the sidewall 521, 522, 523, 524. The root ends 559 of the tab 555 may be attached to the sidewall 521, 522, 523, 524 by welding, brazing, soldering, adhesive, mechanical fasteners, molding, or other attachment means. In some embodiments, the root ends 559 to may be integrated with the sidewall 521, 522, 523, 524 of the brush box 520. In other words, the brush box 520 may be a monolithic member (e.g., a unitary member having a continuous molecular structure) including the tab 555. In some embodiments, the sidewall 521, 522, 523, 524 of the brush box 520 may include one or more openings 565 corresponding to the one or more tabs 555 projecting from the sidewall 521, 522, 523, 524. In other embodiments, the sidewalls 521, 522, 523, 524 may be solid, not including any openings, and the tabs 555 may be attached to the inner surface 527 of the sidewalls 521, 522, 523, 524.

In some embodiments, the thickness (i.e. the distance between the inner surface and the outer surface) of the tabs 555 may be less than the thickness (i.e. the distance between the inner surface 527 and the outer surface 528) of a sidewall 521, 522, 523, 524. Therefore, the brush box 520 may retain substantial integrity in order to securely hold a brush relative to a conductive surface, yet the tabs 555 may provide a sufficient amount of resiliency to absorb vibrations or movements of a brush disposed in the brush box 520.

Figure 18:
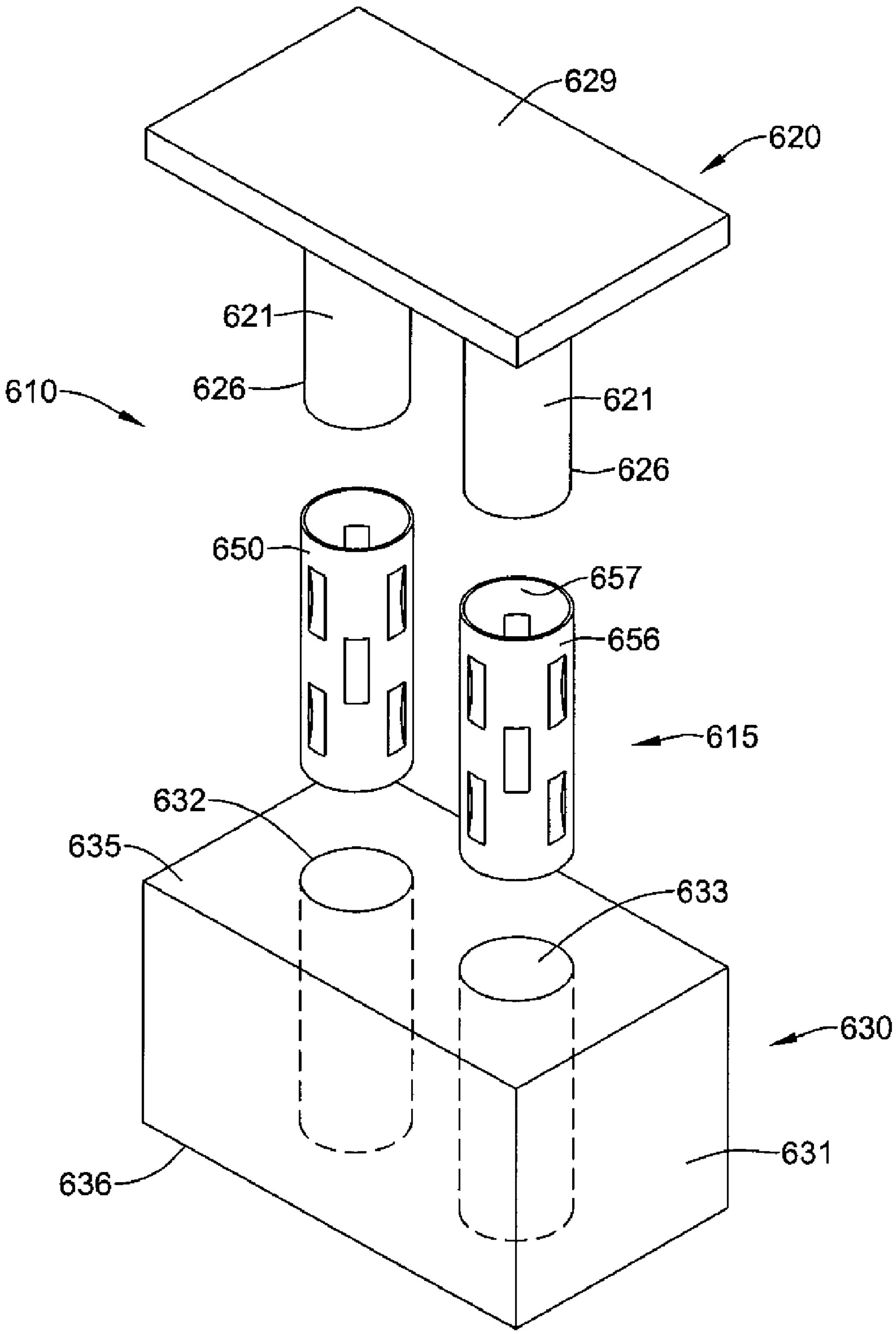
FIG. 18 is an exploded view of another illustrative brush holder assembly.

Another brush holder assembly 610 is shown in FIG. 18. The brush holder assembly 610 includes a brush holder 620, a brush 630, and one or more resilient structures 615, such as resilient sleeves 650. The brush holder assembly 610 may also include a spring (not shown) or other biasing member configured to exert a continuous force on the brush 630 to maintain contact between the brush 630 and a conductive surface.

The brush holder 620 may include a base or mounting portion 629 for mounting the brush holder 620 to a rigid structure. One or a plurality of posts 621 may be attached to and extend from the mounting portion 629. The post(s) 621 may have any desired cross section. For example, the post(s) 621 may have a circular, oval, square, rectangular, or other desired cross section. The post(s) 621 may also have any desired length. The post(s) 621 may have an outer surface 626, such as a concave, a convex, a planar surface, or a combination thereof.

The brush 630 may be any desired shape, such as a block, having a top surface 635, a bottom surface 636, and a peripheral side surface 631. The brush 630 may also include one or a plurality of openings 632. The opening(s) 632 may be any desired shape, for example, the opening(s) 632 may be circular, oval, square, rectangular, or the like. The shape of the opening(s) 632 may complementary to the shape of the post (s) 621, such that the post(s) 621 may fit into the opening(s) 632. The opening(s) 632 may extend from the top surface 635 into or through the brush 630. For example, the opening(s) 632 may be a through opening extending entirely through the brush 630 from the top surface 635 to the bottom surface 636, or the opening(s) 632 may be a blind opening extending from the top surface 635 into, but not completely through the brush 630. The opening(s) 632 may have a surface 633 defining an inner surface of the brush 630.

The brush 630 and the brush holder 620 may be configured such that the one or more posts 621 of the brush holder 620 may be slidably disposed in the one or more openings 632 of the brush 630. Thus, the one or more posts 621 may hold the brush 630 in a relationship with a conductive surface. The one or more resilient structures 615, such as the sleeve 650, may be positioned between the inner surface 633 of the brush 630 and the outer surface 626 of the one or more posts 621 of the brush holder 620. The inner surface 657 of the sleeve 650 may be adjacent to the outer surface 626 of the post 621, and the outer surface 656 of the sleeve 650 may be adjacent to the inner surface 633 of the brush 630. Thus, the sleeve 650 may be able to absorb vibrations, deflections, shifts, or other movements of the brush 630 without allowing the brush 630 to impact against the outer surface 626 of the posts 621. In some embodiments, the sleeve 650 may be attached to or otherwise secured to the post 621, such that the sleeve 650 does not move relative to the post 621 as the brush 630 advances along the post 621 during the lifetime of the brush 630.

Figure 19:
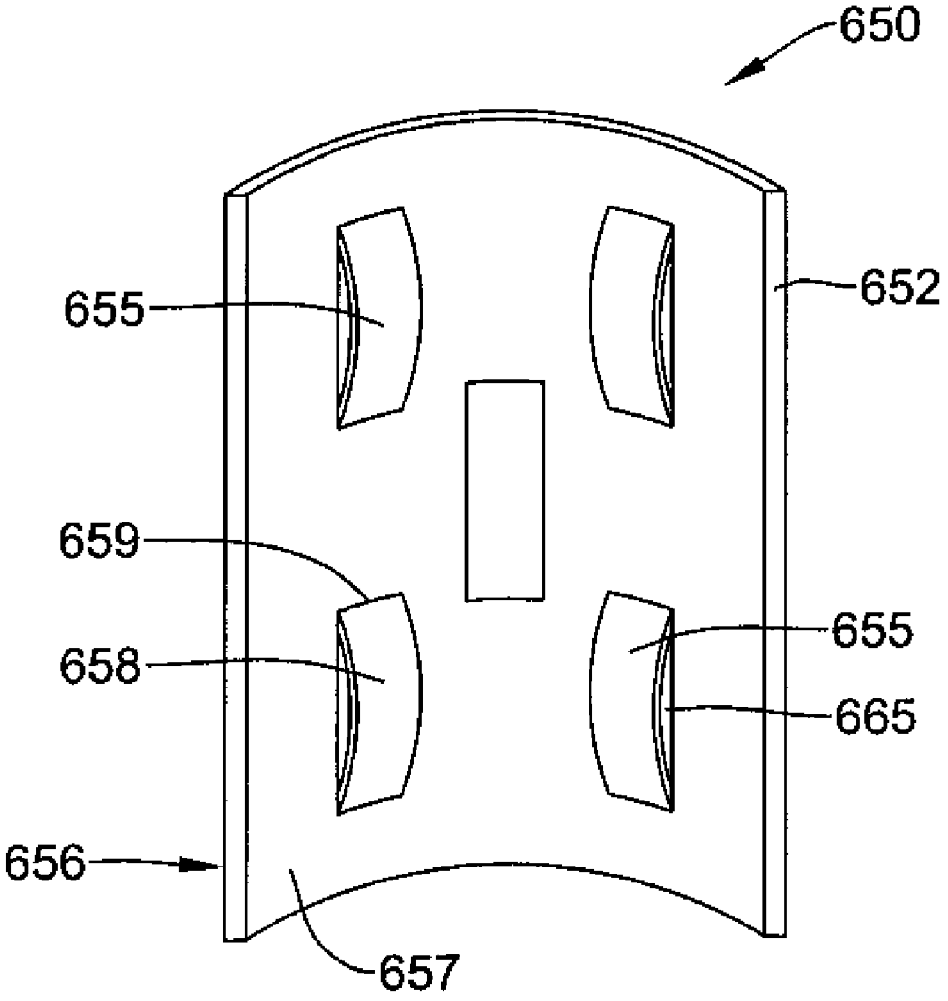
FIG. 19 is a cut-away view of an illustrative resilient member shown in FIG. 18.

The cut-away view of the sleeve 650 shown in FIG. 19 illustrates that, in some embodiments, the sleeve 650 may include a plurality of resilient tabs 655. The resilient tabs 655 may be similar to the resilient tabs described herein, or the resilient tabs 655 may be dissimilar. The sleeve 652 includes a peripheral wall 652 which may be continuous or discontinuous. The resilient tabs 655 may extend from the peripheral wall 652 of the sleeve 650. For example, one or a plurality of tabs 655 may extend inward from the peripheral wall 652 at an angle, such as an oblique angle or a perpendicular angle, to the inner surface 657 of the sleeve 650. Alternatively, the tabs 655 may extend outward from the peripheral wall 652 at an angle, such as an oblique angle or a perpendicular angle, to the outer surface 656 of the sleeve 650. In some embodiments, the sleeve 650 may include one or a plurality of resilient tabs 655 extending outward from the peripheral wall 652 and one or a plurality of resilient tabs 655 extending inward from the peripheral wall 652. The tabs 655 may be similar to other tabs previously described herein, or the tabs 655 may be dissimilar. The tabs 655, as shown in FIG. 19, may be configured and adapted for sliding engagement with the brush 630 and/or the post 621 of a brush holder 620. The sleeve 650 may be positioned between the brush 630 and the post 621. Thus, the tabs 655 may provide a degree of resiliency to absorb vibrations, deflections, shifts, or other movements of the brush 630 relative to the brush holder 620.

Each tab 655 may include a middle portion 658 protruding from the inner surface 657 of the sleeve 650 and roots ends 659 attached to the peripheral wall 652. The root ends 659 of the tab 655 may be attached to the peripheral wall 652 by welding, brazing, soldering, adhesive, mechanical fasteners, molding, or other attachment means. In some embodiments, the root ends 659 may be integrated with the peripheral wall 652 of the sleeve 650. In other words, the sleeve 650 may be a monolithic member (e.g., a unitary member having a continuous molecular structure) including the tab 655. In some embodiments, the peripheral wall 652 may include one or more openings 665 corresponding to the one or more tabs 655 projecting from the peripheral wall 652. Alternatively or additionally, the sleeve 650 may include corrugations, such as horizontal, vertical, or diagonal corrugations. Thus, in some embodiments, the sleeve 650 may include peaks and valleys alternately contacting the inner surface 633 of the brush 630 and the outer surface 626 of the brush holder 620.

Figure 20:
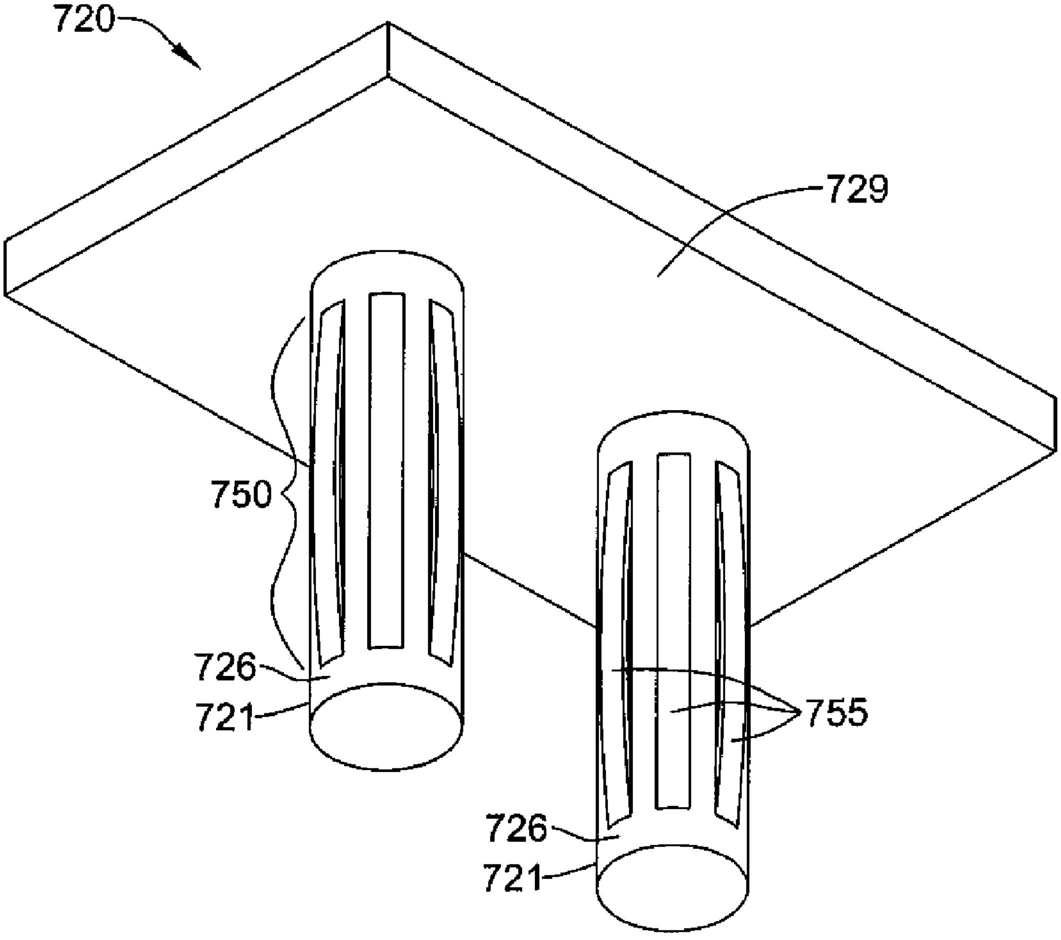
FIG. 20 is a perspective view of another illustrative brush holder assembly.

Another illustrative brush holder 720 is shown in FIG. 20. The brush holder 720 may include a base or mounting portion 729 for mounting the brush holder 720 to a rigid structure. One or a plurality of posts 721 may be attached to and extend from the mounting portion 729. The post(s) 721 may have any desired cross section. For example, the post(s) 721 may have a circular, oval, square, rectangular, or other desired cross section. The post(s) 721 may also have any desired length. The post(s) 721 may have an outer surface 726, such as a concave, a convex, a planar surface, or a combination thereof. Each post 721 may include a resilient structure 750, such as resilient tabs 755, extending from the outer surface 726 of the post 721. The resilient structure 750 may be integrally formed with the post 721, secured to the post 721, slidably disposed on the post 721, releasably attached to the post 721, or otherwise disposed about the outer surface 726 of the post 721. A brush, such as the brush described with regards to FIG. 18 may be positioned on the brush holder assembly 720 such that the post(s) 721 extends into openings formed in the brush. The resilient structure 750 may deflect inward (e.g., toward the central longitudinal axis of the post 721) as the resilient structure 750 extends into the opening of a brush. Therefore, the resilient structure 750 of a post 721 may be in contact with the inner surface of an opening of the brush. Thus, the resilient structure 750 may be able to absorb vibrations, deflections, shifts, or other movements of a brush. The resilient structure 750 may be in sliding contact with the inner surface of a brush, such as the brush shown in FIG. 18. Thus, in some embodiments, an electrically conductive pathway may extend from a brush, through the resilient structure 750 and into the post 721 of the brush holder 720.

It is noted that other means may be used to secure the resilient member to a brush box. For example, hooks, clips, grooves, indentations, protrusions, springs, fasteners, an abutting surface, welding, brazing, soldering, or the like, may be used to impede dislocation of the resilient member from a brush box. Additionally, although several embodiments showed illustrate the resilient member including one or a plurality of resilient tabs, the resilient member may include a conductive resilient fabric, mesh, or other flexible, resilient material in place of or in addition to the tabs. For instance, the resilient member may include one or a plurality of portions of woven fabric or mesh material adapted for contacting the brush holder.

It is noted that different embodiments can be suited and sized for use in the particular electrical device in which they are to be incorporated. For example, some embodiments are suited and sized for use in large industrial electrical generators or motors, for example power plants having generators producing in the range of about 0.5 to about 1200 megawatts, or more, and in some embodiments, power plants able to produce in the range of about 100 megawatts or greater. It should be recognized, however, that the intention is not to be limited to use in such embodiments.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A brush holder assembly, comprising:

a brush holder having an inner surface;

a brush for placement in the brush holder, the brush including an outer surface; and a resilient member positionable between the outer surface of the brush and the inner surface of the brush holder, the resilient member including a plurality of discrete electrical contact points extending outward from an outer surface of the resilient member which are configured to engage the inner surface of the brush holder to form an electrically conductive pathway between the brush and the brush holder;

wherein there is a greater concentration of discrete electrical contact points proximate a lower end of the resilient member than there is proximate an upper end of the resilient member.

2. The brush holder assembly of claim 1, wherein the outer surface of the resilient member is spaced away from direct contact with the inner surface of the brush holder.

3. The brush holder assembly of claim 1, wherein the plurality of discrete electrical contact points are resilient tabs extending outward from the outer surface of the resilient member.

4. The brush holder assembly of claim 3, wherein the resilient tabs are flexible to absorb movement of the brush relative to the brush holder.

5. The brush holder assembly of claim 1, wherein the outer surface of the resilient member is defined by a plurality of side walls, wherein each of the plurality of side walls of the resilient member includes at least one discrete electrical contact point extending outward therefrom.

6. The brush holder assembly of claim 1, wherein the brush holder includes an upper open end and a lower open end, wherein the resilient member extends entirely through the brush holder from the upper open end to the lower open end.

7. The brush holder assembly of claim 1, wherein the brush is devoid of an electrical shunt extending from the brush.

8. The brush holder assembly of claim 1, wherein the brush includes a top, a bottom, and four sides, and wherein the resilient member comprises a sleeve having an inner surface in contact with each of the four sides of the brush.

9. The brush holder assembly of claim 8, wherein the inner surface of the sleeve contacts the brush over a majority of the surface area of the four sides of the brush.

10. A resilient member for use in a brush holder assembly, the resilient member comprising:

an open-ended sleeve having a peripheral wall extending from a first open end to a second open end of the sleeve, the peripheral wall including a first sidewall, a second sidewall, a third sidewall and a fourth sidewall, and at least one discrete electrical contact point extending outward from each of the first, second, third and fourth sidewalls which are configured to engage the inner surface of the brush holder to form an electrically conductive pathway between the brush and the brush holder.

11. The resilient member of claim 10, wherein there is a greater concentration of discrete electrical contact points proximate the second open end of the sleeve than there is proximate the first open end of the sleeve.

12. The resilient member of claim 10, wherein the sleeve is configured to be positioned between a surface of a brush and a surface of a brush holder to isolate the brush from direct contact with the brush holder.

13. The resilient member of claim 10, wherein the first end of the sleeve is flared outward.

14. The resilient member of claim 13, wherein the second end of the sleeve is flared outward.

15. A brush holder assembly, comprising:

a brush holder having an inner surface;

a brush disposed in the brush holder, the brush having a top surface, a bottom surface, and a plurality of side surfaces; and a resilient sleeve interposed between the brush holder and the brush to isolate the brush from direct contact with the inner surface of the brush holder, wherein the resilient sleeve includes an inner surface in contact with each of the plurality of side surfaces of the brush and an outer surface having a plurality of discrete electrical contact points extending outward from the outer surface to engage the inner surface of the brush holder to form an electrically conductive pathway between the brush and the brush holder;

wherein the outer surface of the resilient sleeve is spaced away from the inner surface of the brush holder.

16. The brush holder assembly of claim 15, wherein the plurality of discrete electrical contact points are a plurality of resilient tabs extending outward from the outer surface, to engage the inner surface of the brush holder.

17. The brush holder assembly of claim 15, wherein the inner surface of the resilient sleeve is in contact with a majority of the surface area of each of the plurality of side surfaces of the brush.

18. The brush holder assembly of claim 15, wherein the resilient sleeve extends entirely through the brush holder from an upper open end of the brush holder to a lower open end of the brush holder.

19. The brush holder assembly of claim 15, wherein the resilient sleeve includes eight or more discrete electrical contact points engaging the inner surface of the brush holder.

20. The brush holder assembly of claim 15, wherein there is a higher concentration of discrete electrical contact points proximate a first end of the resilient sleeve and a lower concentration of discrete electrical contact points proximate a second end of the resilient sleeve.

* * * * *